United States Patent
Ju et al.

(10) Patent No.: US 11,506,678 B2
(45) Date of Patent: Nov. 22, 2022

(54) AUTOMATIC ANALYSIS APPARATUS AND OPERATING METHOD THEREFOR

(71) Applicant: SHENZHEN MINDRAY BIO-MEDICAL ELECTRONICS CO., LTD., Shenzhen (CN)

(72) Inventors: Wentao Ju, Shenzhen (CN); Chongdong He, Shenzhen (CN); Jun Wang, Shenzhen (CN); Yanwen Weng, Shenzhen (CN); Chuanfen Xie, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 484 days.

(21) Appl. No.: 16/825,919

(22) Filed: Mar. 20, 2020

(65) Prior Publication Data

US 2020/0241028 A1 Jul. 30, 2020

Related U.S. Application Data

(63) Continuation of application No. PCT/CN2017/102534, filed on Sep. 20, 2017.

(51) Int. Cl.
*G01N 35/04* (2006.01)
*G01N 35/10* (2006.01)

(52) U.S. Cl.
CPC ........... *G01N 35/04* (2013.01); *G01N 35/109* (2013.01); *G01N 2035/0477* (2013.01)

(58) Field of Classification Search
CPC ................. G01N 35/04; G01N 35/109; G01N 2035/0477; G01N 2035/0453;
(Continued)

(56) References Cited

U.S. PATENT DOCUMENTS

| | | | |
|---|---|---|---|
| 2009/0028759 A1* | 1/2009 | Su | B03C 1/288 422/400 |
| 2009/0129979 A1 | 5/2009 | Kegelman et al. | |

(Continued)

FOREIGN PATENT DOCUMENTS

| | | |
|---|---|---|
| CN | 1963527 A | 5/2007 |
| CN | 102419375 A | 4/2012 |

(Continued)

OTHER PUBLICATIONS

International Search Report issued in corresponding International Application No. PCT/CN2017/102534, dated Jun. 15, 2018, 4 pages.

*Primary Examiner* — Benjamin R Whatley
*Assistant Examiner* — Curtis A Thompson
(74) *Attorney, Agent, or Firm* — Kory D. Christensen

(57) ABSTRACT

An automatic analysis apparatus and an operating method for the automatic analysis apparatus. At least two magnetic separation units are introduced, each magnetic separation unit operating independently and being used for performing magnetic separation cleaning on a reaction solution in a reaction cup. Each magnetic separation unit may be used for any magnetic separation cleaning step in a one-step test project or a multi-step test project, thereby significantly increasing the test speed and the test throughput of the automatic analysis apparatus.

23 Claims, 9 Drawing Sheets

(58) Field of Classification Search
CPC ....... G01N 2035/0458; G01N 35/0098; G01N 21/27; B03C 2201/20; B03C 2201/26; B03C 2201/32; B03C 1/01; B03C 1/288
See application file for complete search history.

(56) References Cited

U.S. PATENT DOCUMENTS

| | | | |
|---|---|---|---|
| 2009/0173681 A1* | 7/2009 | Siddiqi | B03C 1/01 |
| | | | 210/222 |
| 2012/0149127 A1* | 6/2012 | Toyoshima | G01N 35/0098 |
| | | | 422/67 |
| 2013/0034466 A1* | 2/2013 | Wakamiya | G01N 35/0092 |
| | | | 422/63 |
| 2017/0088831 A1* | 3/2017 | Wang | G01N 35/1002 |

FOREIGN PATENT DOCUMENTS

| | | |
|---|---|---|
| CN | 102608309 A | 7/2012 |
| CN | 104345158 A | 2/2015 |
| EP | 0563893 A2 | 10/1993 |

* cited by examiner

AUTOMATIC ANALYSIS APPARATUS AND OPERATING METHOD THEREFOR

CROSS-REFERENCE TO RELATED APPLICATIONS

This application is a bypass continuation of Patent Cooperation Treaty Application No. PCT/CN2017/102534, filed on Sep. 20, 2017, the content thereof is hereby incorporated by reference in its entirety.

TECHNICAL FIELD

The present disclosure relates to an automatic analysis apparatus and an operating method therefor.

BACKGROUND

Automatic analysis apparatuses, taking an immunoassay analyzer as an example, are a type of highly sensitive and highly specific analysis instruments, and are often used in clinical laboratories to detect various analysis indexes of blood, urine or other body fluids. Traditional immunoassay analyzers have multiple implementation principles, such as chemiluminescence and electrochemical luminescence. Taking a heterogeneous chemiluminescence immunoassay analyzer as an example, referring to FIG. 1, the main operating principle is as follows: when it is necessary to measure a certain component in a sample, a magnetic bead reagent can be formed by coating magnetic beads with a corresponding antibody/antigen, and a labeling reagent can be formed by labeling the antibody with a specific label (a reagent for measuring an analysis project generally has multiple components, such as the magnetic bead reagent component and the labeled reagent component here, and different components for the same project can be packaged in different reagent containers or in different chambers of the same reagent container). In a test process, firstly, a sample containing a component to be measured is successively mixed with a magnetic bead reagent, a labeling reagent and other reagents to form a sample-reagent reaction solution (referred to as a reaction solution), and the sample-reagent reaction solution is subjected to incubation and reaction under certain conditions to form a reaction complex; the unbound labels, other reagents and sample components in the reaction system are then removed by means of bound-free (B/F) technology; and a signal reagent is then added thereto such that the labels on the reaction complex reacts with the signal reagent (or catalyzes the signal reagent) to emit light; one or more signal reagents may be provided, such as a luminescent substrate solution, a pre-excitation solution, an excitation solution and a luminous enhancement fluid. There are many specific coating and cleaning methods including, in addition to the magnetic bead cleaning method described above, coating a wall of a reaction container with an antibody, using plastic beads, etc.

The existing immunoassay analyzers generally have low test throughput, which cannot meet the increasing size of test in this field so as to seriously affect the operating efficiency of doctors and other users who need to diagnose based on the sample measurement results.

SUMMARY

The present disclosure mainly provides an automatic analysis apparatus and an operating method therefor.

According to a first aspect, an automatic analysis apparatus is provided in one embodiment, which includes:
a reaction cup loading mechanism configured to supply and carry a reaction cup to a cup assignment station;
a sample unit configured to hold a sample;
a sample dispensing mechanism configured to aspirate the sample and discharge the sample into a reaction cup at a sample addition station;
a reagent unit configured to hold a reagent;
a reagent dispensing mechanism configured to aspirate the reagent and discharge the reagent into a reaction cup at a reagent addition station;
a reaction plate, which is configured to be of a circular plate structure, which has a plurality of placement stations for placement of reaction cups, and which is capable of rotating and driving a rotation of the reaction cups in the placement stations so as to transfer the reaction cups in the reaction plate and incubate a reaction solution in the reaction cup;
a mixing mechanism configured to mix the reaction solution to be mixed in the reaction cup;
a measurement unit configured to measure the reaction solution to be measured;
at least two magnetic separation units, each of which operates independently and is configured to perform magnetic separation cleaning on the reaction solution in the reaction cup;
a transfer mechanism configured to at least transfer a reaction cup among the reaction cup loading mechanism, the reaction plate, the mixing mechanism and the magnetic separation units; and
a control unit configured to at least control operations and a time sequence of the sample dispensing mechanism, the reagent unit, the reagent dispensing mechanism, the reaction plate, the mixing mechanism, the measurement unit, the magnetic separation units and the transfer mechanism.

According to a second aspect, an operating method for an automatic analysis apparatus is provided in one embodiment, the automatic analysis apparatus is the automatic analysis apparatus of the above first aspect, the operating method includes: after a test starts, controlling the magnetic separation units to receive the reaction cup in respective corresponding cycles; when N magnetic separation units are provided, a reaction cup receiving cycle corresponding to an ith magnetic separation unit is a (kN+i)th cycle, where N is an integer greater than or equal to 2, k is an integer greater than or equal to 0, and the value of i is in a range of 1 to N.

According to a third aspect, an automatic analysis apparatus is provided in one embodiment, which includes:
a dispensing mechanism configured to aspirate and discharge a solution;
a reaction plate, which is configured to be of a circular plate structure, which has a plurality of placement stations for placement of reaction cups, and which is capable of rotating and driving a rotation of the reaction cups in the placement stations so as to transfer the reaction cups in the reaction plate and incubate a reaction solution in the reaction cup;
a transfer mechanism configured to transfer the reaction cup into or out of the reaction plate;
two cleaning solution placement stations, one of which is configured to hold a container filled with a concentrated cleaning solution, and another of which is configured to hold a container filled with a diluent that is configured to dilute the concentrated cleaning solution, and the two cleaning solution placement stations are arranged on the trajectory of motion of the dispensing mechanism; and a control unit configured to control the dispensing mechanism to respectively aspirate a solution in each of the containers at the two cleaning solution placement stations and discharge the solutions into the reaction cup to prepare a diluted cleaning solution.

According to the automatic analysis apparatus and the operating method therefor in the embodiments mentioned above, since at least two magnetic separation units are introduced, each magnetic separation unit operating independently and being configured to perform magnetic separation cleaning on a reaction solution in a reaction cup, each magnetic separation unit may be used for any magnetic separation cleaning step in a one-step test project or a multi-step test project, thereby significantly increasing the test speed and the test throughput of the whole machine.

DETAILED DESCRIPTION OF EMBODIMENTS

Figure 1:
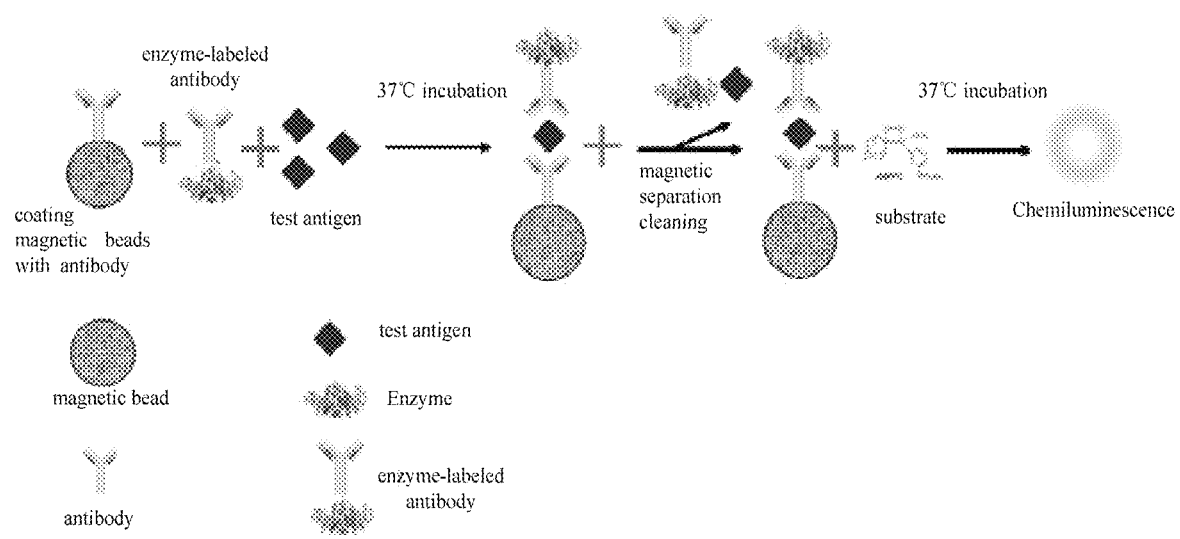
FIG. 1 is a test principle diagram of immunoassay.

The present disclosure will be further described in detail below through specific embodiments in conjunction with the accompanying drawings. Associated similar element reference numerals are used for similar elements in various embodiments. In the following embodiments, many details are described so that the present application can be better understood. However, those skilled in the art may appreciate that some of the features can be omitted or may be substituted by other elements, materials and methods. In certain cases, some operations involved in the present application are not displayed or described in the specification, which is to prevent the core part of the present application from being obscured by too much description. Moreover, for those skilled in the art, the detailed description of the involved operations is not necessary, and the involved operations can be thoroughly understood according to the description in the specification and the general technical knowledge in the art.

In addition, the characteristics, operations or features described in the specification can be combined in any appropriate manner to form various embodiments. Moreover, the steps or actions in the method description can also be exchanged or adjusted in order in a way that would have been obvious to those skilled in the art. Therefore, the various orders in the specification and drawings are merely for the purpose of clear description of a certain embodiment and are not meant to be a necessary order unless otherwise stated that a certain order must be followed.

The serial numbers themselves for the components herein, for example, "first", "second", etc., are merely used to distinguish the described objects, and do not have any sequential or technical meaning. Moreover, as used in the present application, "connection" or "coupling", unless otherwise specified, includes both direct and indirect connections (couplings).

In the present disclosure, a one-step test project means that one test project only needs one step of incubation. Accordingly, a multi-step test project means that one test project needs multiple steps of incubation. For example, a two-step test project means that the test project needs two steps of incubation, in which reagents needed for a first step of incubation are firstly added to the sample, and the first step of incubation is then performed; after the time of the first step of incubation has elapsed, reagents needed for the second step of incubation are added, and then the second step of incubation is performed; and after the time of the second step of incubation has elapsed, magnetic separation is performed, and the measurement is then performed. In general, in a multi-step test project, magnetic separation is needed after the last step of incubation, and then the measurement can be performed; but in a multi-step test project, except for the last step, after the other steps of incubation, whether magnetic separation is needed or not depends on the factors such as the type of test project. For example, in a two-step test project, if magnetic separation is needed after incubation in the first step of test, the two-step test project can be referred to as a two-step two-separation test project, and if no magnetic separation is needed after incubation in the first step of test, the two-step test project can be referred to as a two-step one-separation test project.

In a one-step test project or a multi-step test project, for each step of incubation or for each incubation, one or more types of reagents needed to be added are provided, which is determined according to the factors such as the type of test project; and in a one-step test project or a multi-step test project, if multiple types of reagents is needed to be added for incubation in one or more steps of test, such test project can be referred to as a multi-component test project.

It has been found that in various test projects, magnetic separation cleaning is a necessary process and link. Since magnetic separation cleaning needs a long immobilization time, magnetic separation cleaning is also a time-consuming link, especially for some multi-step test projects that need magnetic separation cleaning for multiple times. In addition, since the cycles of other units or components in the device need to be consistent with the links of magnetic separation cleaning mentioned above, the test speed and test throughput of the device are limited.

It has also been found that during operation of the immunoassay analyzer, the multi-step test project and the multi-component test project are the main reasons that affect the test throughput. Taking a multi-component test project as an example, since the time needed for each aspiration and discharge action of a reagent pin cannot be infinitely compressed, and based on the characteristics of an immune response, the reagent pin needs to perform aspiration and discharge for multiple times in the same cycle to perform dispensing of multiple reagent components in one step of test in one test. In order to avoid cross contamination carried by the reagent pin through an outer wall thereof when different reagent components are aspirated, it is necessary to clean the outer wall of the reagent pin between the steps of aspirating different components, so that the dispensing of multiple reagent components in one step of test is one of the longest time-consuming links in the analysis apparatus, which affects the test throughput. In addition, the immunoassay analyzer sometimes needs to perform test processes such as sample pre-dilution and pre-treatment. Such "non-standard" test processes are also one reason that affects the test throughput.

After the above problems have been found, in order to increase the test speed and test throughput, it has been found that the effect of increasing the test speed and test throughput can be achieved by solving any of the problems in the separation time of magnetic separation cleaning, the dispensing time of a multi-component reagent in a multi-component test project, the simplification for the process of magnetic separation for multiple times, the simplification for the process of a multi-step test project, etc.

Before the present disclosure is proposed, some current technical schemes are firstly viewed herein.

A scheme applied to an electrochemical luminescence analyzer is proposed in the related art, in which two cleaning and photometry mechanisms are provided for performing magnetic separation cleaning and photometry on a reaction solution. For the same type of test projects of multiple samples, magnetic separation cleaning and photometry are only performed in the same cleaning and photometry mechanism, and there will not be the case in which in the samples that need the same type of test project, some are subjected to magnetic separation cleaning and photometry in one cleaning and photometry mechanism, and the other are subjected to magnetic separation cleaning and photometry in another cleaning and photometry mechanism, in other words, the two cleaning and photometry mechanisms do not alternately receive a reaction container containing a reaction solution. This is because the cleaning and photometry mechanism has a photometry function, and different test projects have different calibrators, such that when the same type of test project performs magnetic separation cleaning and photometry in two cleaning and photometry mechanisms, in order to ensure the consistency and accuracy of the test results of the same type of test project, it is necessary to respectively calibrate the two cleaning and photometry mechanisms with calibrators, which increases the consumption of calibrators to significantly increase the costs. Thus, for the same type of test project of multiple samples, magnetic separation cleaning and photometry are only performed in the same cleaning and photometry mechanism, so it is only necessary to calibrate one cleaning and photometry mechanism with calibrators. In addition, in this scheme, both the cleaning and photometry mechanisms perform magnetic separation cleaning for the second step of test in the two-step test project, but the magnetic separation cleaning for the first step of test is completed at other positions.

Chinese Patent Application No. 201110416739.7 discloses an analysis apparatus comprising/including two magnetic separation components, one of which is a first-step magnetic separation component only used to perform magnetic separation cleaning on a first step of test in a two-step test project, and the other one is a second-step magnetic separation component only used to perform magnetic separation cleaning on a second step of test in the two-step test project. In this scheme, the two magnetic separation components cannot be in flexible mutual-use and in parallel, and for a one-step test project, some components, such as the second-step magnetic separation component, do not play a role and are idle during the test process, thus wasting resources and failing to increase the test speed.

Similarly, in an analysis apparatus in the related art, four first-step magnetic separation cleaning stations and four second-step magnetic separation cleaning stations are fixed on a reaction plate, in which the first-step magnetic separation cleaning stations are just used to perform magnetic separation cleaning for a first step of test in a two-step test project, and the second-step magnetic separation cleaning stations are just used to perform magnetic separation cleaning for a second step of test in the two-step test project.

Similarly, in an analysis apparatus in the related art, a reaction plate thereof comprises/includes three circles of tracks, in which the outermost circle of track is just used to perform magnetic separation cleaning for a first step of test in a two-step test project, the intermediate circle of track is just used to perform magnetic separation cleaning for a second step of test, and the innermost circle of track is used for incubation.

Figure 2:
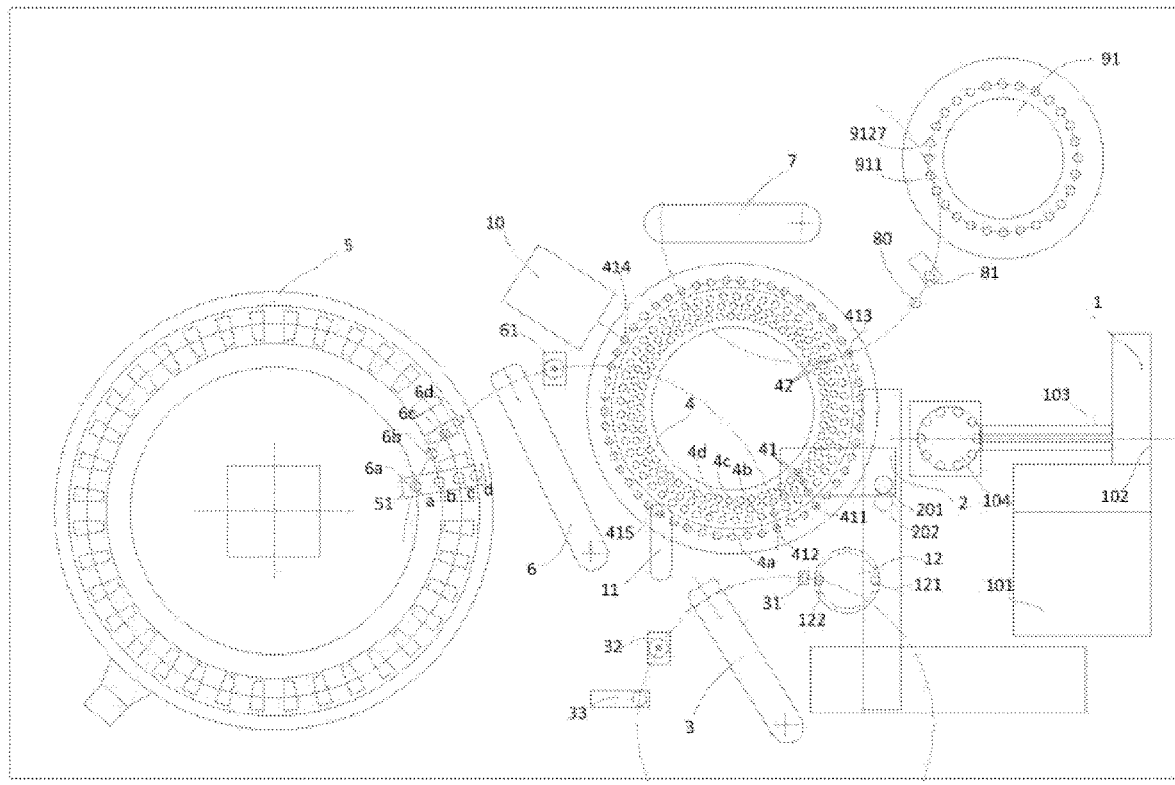
FIG. 2 is a structural schematic diagram of an automatic analysis apparatus of one embodiment.
Figure 3:
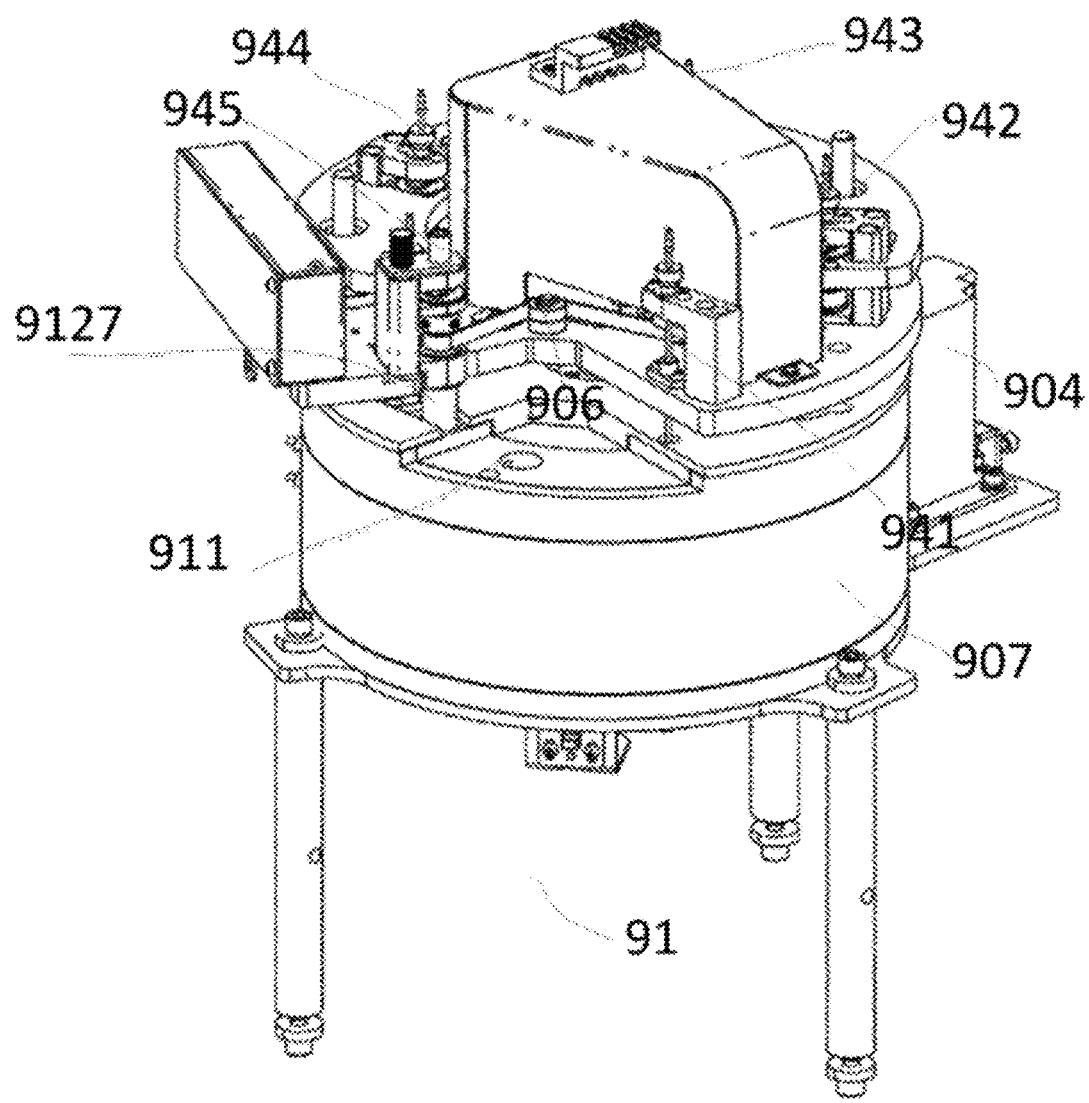
FIG. 3 is an overall structural schematic diagram of a magnetic separation unit of one embodiment.
Figure 4:
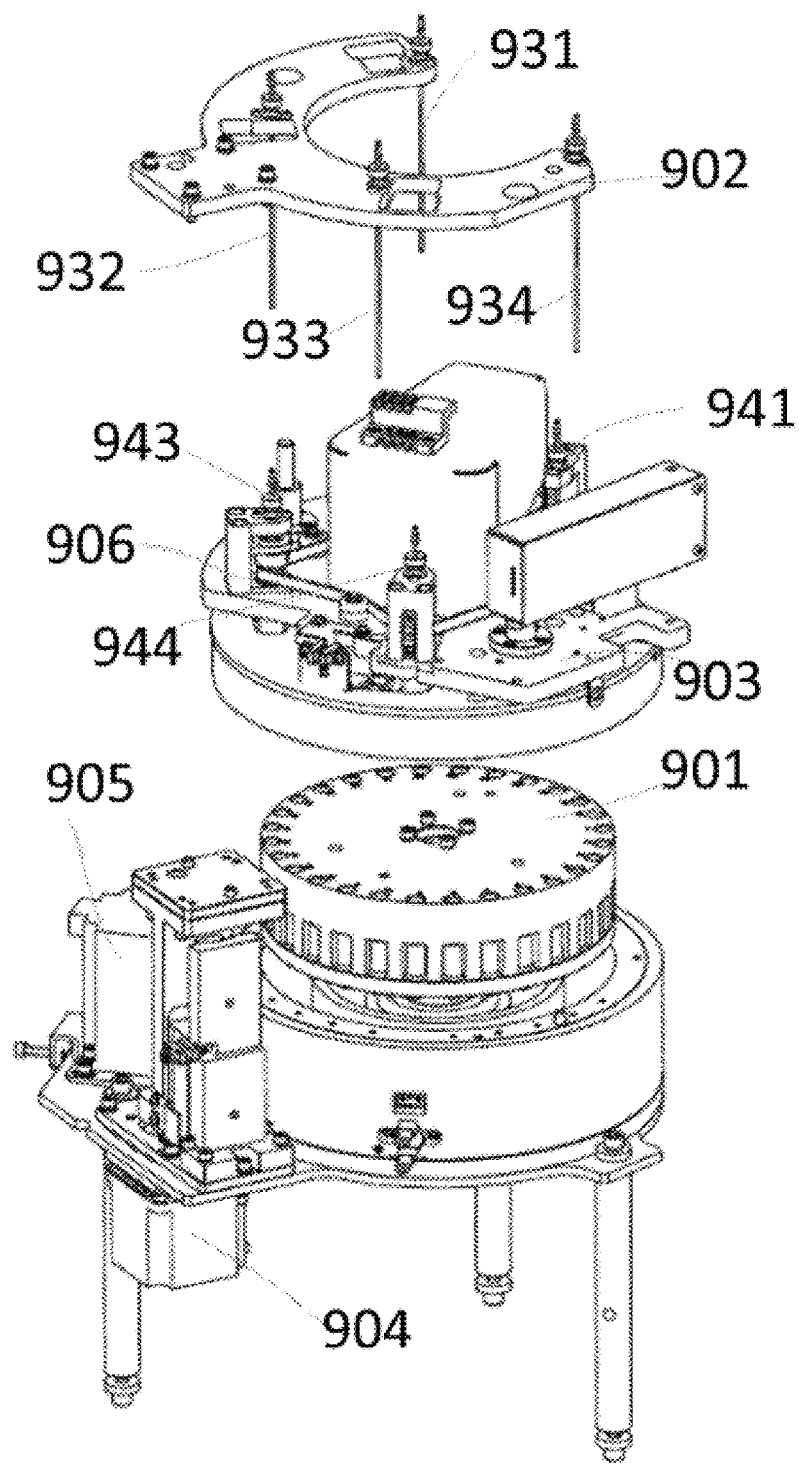
FIG. 4 is an exploded view of a magnetic separation unit of one embodiment.

The present disclosure proposes an automatic analysis apparatus, with reference to FIG. 2, comprising a reaction cup loading mechanism 1, a sample unit 33, a sample dispensing mechanism 3, a reagent unit 5, a reagent dispensing mechanism 6, a reaction plate 4, a mixing mechanism, a measurement unit 10, a magnetic separation unit, a transfer mechanism and a control unit (not depicted in the figure).

The reaction cup loading mechanism 1 is used to supply and carry a reaction cup/reaction vessel to a cup assignment station. In one embodiment, the cup assignment station is used to transfer, by the transfer mechanism, the reaction cup to a sample addition station. In one embodiment, the reaction cup loading mechanism comprises a feed compartment 101, a pick-and-place/pickup mechanism 102, a reversing mechanism 103 and a transport mechanism 104. The feed compartment 101 is used to store the reaction cup. The pick-and-place mechanism 102 is used to pick and place, deliver and unload the reaction cup. The reversing mechanism 103 is engaged behind the pick-and-place mechanism 102, and the reversing mechanism 103 has a delivery/conveying trough that is arranged obliquely downward from one side of the pick-and-place mechanism 102, the delivery trough is sized such that a lower portion of the reaction cup can extend into the delivery trough, the delivery trough has a width less than the width of a hanging portion of the reaction cup, and the delivery trough is at least provided, at one end thereof close to the pick-and-place mechanism 102, with a first trough bottom wall, with the distance from the first trough bottom wall to an upper edge of the delivery trough being less than the distance from a lowermost portion to the hanging portion of the reaction cup. The transport mechanism 104 is engaged at a reaction cup exit of the above delivery trough, and the transport mechanism 104 has at least one reaction cup station for storing a reaction cup used for placement of a reaction cup; and the transport mechanism 104 is provided with the above cup assignment station, for example, one of the reaction cup stations on the transport mechanism 104 is arranged to be a cup assignment station. In one embodiment, the transport mechanism 104 may be of a plate structure.

The sample unit 33 is used to hold a sample. The sample unit 33 comprises a sample conveying module that comprises a sample delivery module (SDM) and a front-end track (not depicted in the figure).

The sample dispensing mechanism 3 is used to aspirate the sample and discharge the sample into a reaction cup at the sample addition station. In one embodiment, the sample dispensing mechanism 3 comprises a sample pin, and one sample pin is provided. In one embodiment, the whole process of action of the sample dispensing mechanism 3 to complete one sample addition or dispensing is as follows: moving to a sample aspiration station to aspirate a sample, moving to a corresponding cleaning station to clean an outer wall, then moving to a sample addition station to discharge the aspirated sample into a reaction cup at the sample addition station, and finally moving to a corresponding cleaning station to clean inner and outer walls, e.g., the cleaning for the sample dispensing mechanism 3 can be performed at a sample pin cleaning unit 32.

The reagent unit 5 is used to hold a reagent. In one embodiment, the reagent unit 5 is configured to be of a circular plate structure, the reagent unit 5 has a plurality of positions for holding a reagent container, the reagent unit can rotate and drive a rotation of the reagent container held thereby and is used to rotate the reagent container to a reagent aspiration station so that the reagent is aspirated by the reagent dispensing mechanism 6. In one embodiment, one reagent unit 5 is provided, which can be arranged outside the reaction plate 4 in a separated manner.

The reagent dispensing mechanism 6 is used to aspirate the reagent and discharge the reagent into the reaction cup at the reagent addition station. In one embodiment, the reagent dispensing mechanism 6 comprises a reagent pin, and one reagent pin is provided. In one embodiment, the whole process of action of the reagent dispensing mechanism 6 to complete one reagent addition or dispensing is as follows: moving to a reagent aspiration station to aspirate a reagent, then moving to a corresponding cleaning station to clean an outer wall, then moving to a reagent addition station to discharge the aspirated reagent into a reaction cup at a reagent addition station, and finally moving to a corresponding cleaning station to clean inner and outer walls. In one embodiment, when the reagent pin is arranged to continuously aspirate multiple reagents and then discharge the reagents together, the reagent pin is controlled to continuously perform multiple reagent aspiration operations to aspirate multiple reagents as desired, in which during aspiration of the multiple reagents as desired, after one reagent aspiration operation and before the next reagent aspiration operation, it is necessary to perform cleaning on the outer wall of the reagent pin, e.g., perform cleaning at a reagent pin cleaning tank unit 61.

The reaction plate 4 is configured to be of a circular plate structure, the reaction plate 4 is provided with a plurality of placement stations for placement of reaction cups, and the reaction plate can rotate and drive a rotation of the reaction cups inside the placement stations so as to transfer the reaction cups in the reaction plate and incubate a reaction solution in the reaction cup. In one embodiment, the reaction plate 4 comprises an inner circle portion and an outer circle portion which can independently rotate or rotate together; the inner circle portion comprises one or more circles of tracks, each of which is provided with a plurality of placement stations used to incubate the reaction cups and transfer the reaction cups between the placement stations at the inner circle portion; and the outer circle portion comprises one or more circles of tracks, each of which is provided with a plurality of placement stations for scheduling the reaction cups between the placement stations at the outer circle portion. FIG. 2 shows an outer circle portion having one circle of track 4a, and an inner circle portion having three circles of tracks 4b, 4c, 4d. In one embodiment, one reaction plate 4 is provided.

In one embodiment, the reaction plate is provided with a measurement station and/or a waste solution/liquid aspiration station; the measurement station is used to measure the reaction cup by the measurement unit 10, i.e., the reaction cup transferred to the measurement station is measured by the measurement unit 10. In one embodiment, when the measurement unit 10 is an optical measurement unit, the measurement station is an optical measurement station; and for the reaction cup that has been measured, a waste solution is aspirated at the waste solution aspiration station. In one embodiment, the measurement station and the waste solution aspiration station are arranged at the outer circle portion of the reaction plate 4, e.g., the measurement station or the waste solution aspiration station is one placement station on the outer circle portion of the reaction plate 4. For example, the measurement station 414 and the waste solution aspiration station 415 in FIG. 2. For the reaction cup that has been measured, a waste solution is aspirated at the waste solution aspiration station, so in one embodiment, the automatic analysis apparatus further comprises a waste solution aspiration unit 11 used to aspirate the reaction solution in the reaction cup that has been measured, and the waste solution aspiration unit includes a waste solution aspiration pin, with a trajectory of motion of the waste solution aspiration pin passing the waste solution aspiration station. In one embodiment, the reagent addition station is arranged inside the reaction plate, i.e., the reaction plate has a reagent addition station. In one embodiment, the reagent addition station is arranged at the outer circle portion of the reaction plate 4, e.g., the reagent addition station 412 in FIG. 2. In one embodiment, the sample addition station is arranged inside or outside the reaction plate 4, e.g., the sample addition station 31 arranged outside the reaction plate 4 as shown in FIG. 2.

The mixing mechanism is used to mix the reaction solution to be mixed in the reaction cup. One or more mixing mechanisms are provided. In one embodiment, two mixing mechanisms are provided, e.g., a mixing mechanism 81 and a mixing mechanism 82 in FIG. 11. In one embodiment, the mixing mechanisms are arranged outside the reaction plate 4 in a separated manner. When two mixing mechanisms are comprised, the two mixing mechanisms may also be configured such that one receives a reaction cup in an odd-numbered cycle, and the other receives a reaction cup in an even-numbered cycle. It should be noted that if one of the mixing mechanisms is configured to receive a reaction cup in an odd-numbered cycle, it means that as long as a reaction cup that needs to be transferred to the mixing mechanism appears in an odd-numbered cycle, the reaction cup will be transferred to the mixing mechanism described above that receives a reaction cup in an odd-numbered cycle; and similarly, as long as a reaction cup that needs to be transferred to the mixing mechanism appears in an even-numbered cycle, the reaction cup will be transferred to the mixing mechanism described above that receives a reaction cup in an even-numbered cycle; and meanwhile, it does not mean that a reaction cup that needs to be transferred to the mixing mechanism will appear in each cycle, for example, the mixing mechanism that is arranged to receive a reaction cup in an odd-numbered cycle may not be able to receive a reaction cup in every odd-numbered cycle, because it is possible that a reaction cup that needs to be transferred to the mixing mechanism may not appear in some odd-numbered cycles. In one embodiment, the mixing mechanism can perform a non-mixing operation, a short mixing operation and a long mixing operation on a reaction cup, that is, the mixing operations of the mixing mechanism include three operations, i.e., the non-mixing operation, the short mixing operation and the long mixing operation.

The measurement unit 10 is used to measure the reaction solution to be measured. In one embodiment, the measurement unit 10 is an optical measurement unit, e.g., used to detect the light-emitting intensity of the reaction solution to be measured and calculate the concentration of components to be measured in the sample and the like. In one embodiment, the measurement unit 10 is arranged outside the reaction plate 4 in a separated manner. In one embodiment, the measurement unit 10 and the magnetic separation unit are arranged in a separated manner. The measurement station may be arranged inside the reaction plate 4 or may be arranged outside the reaction plate 4.

At least two magnetic separation units are provided, each of the magnetic separation units operates independently and is used to perform magnetic separation cleaning on the reaction solution in the reaction cup. In one embodiment, the magnetic separation unit comprises a magnetic separation plate of a circular plate structure, the magnetic separation plate is provided with one or more circles of tracks for independent or simultaneous movement, each of the tracks comprises a plurality of placement stations for placement of reaction cups, the magnetic separation plate can rotate and drive a rotation of the reaction cups in the placement stations thereof and used to transfer a reaction cup inside the magnetic separation plate to a solution addition station and a solution aspiration station to perform magnetic separation cleaning. In one embodiment, the magnetic separation unit is arranged outside the reaction plate 4 in a separated manner. In one embodiment, the magnetic separation units are arranged in a separated manner; or else the magnetic separation units are arranged in a coaxial and independently driven manner. In one embodiment, two magnetic separation units are provided, such as a magnetic separation unit 91 and a magnetic separation unit 92 in FIG. 11.

In one embodiment, after the automatic analysis apparatus is started, the magnetic separation units receive a reaction cup in respective corresponding cycles, and when N magnetic separation units are provided, the cycle of receiving a reaction cup corresponding to the ith magnetic separation unit is the (kN+i)th cycle; where N is an integer greater than or equal to 2, k is an integer greater than or equal to 0, the value of i is in a range from 1 to N, and i is also an integer. For example, when two magnetic separation units are provided, the two magnetic separation units are controlled to receive a reaction cup in respective corresponding cycles, such that one of which has a corresponding cycle of receiving a reaction cup being an odd-numbered cycle, and the other of which has a corresponding cycle of receiving a reaction cup being an even-numbered cycle.

In one embodiment, after the magnetic separation unit receives a reaction cup, the reaction cup is subjected to Y-stage magnetic separation cleaning; where Y is an integer greater than or equal to 1; and for any stage of magnetic separation cleaning, the operating method comprises: injecting a separation solution into the reaction cup to perform magnetic separation cleaning on the reaction solution in the reaction cup; then performing solution aspiration on the reaction cup so as to complete magnetic separation cleaning of this stage; and allowing the reaction cup that has finished the Y-stage magnetic separation cleaning to wait for being transferred out of the magnetic separation unit, e.g., when this step of magnetic separation cleaning is not the last step of test in the multi-step test project, or else adding a substrate to the reaction cup that has finished the Y-stage magnetic separation cleaning and waiting for being transferred out of the magnetic separation unit.

In the present disclosure, at least two independently operating magnetic separation units are used to achieve the speed increase of the automatic analysis apparatus, and in order to reduce costs, the magnetic separation units may have a shared design of fluid path system for a magnetic separation solution-injection mechanism, a magnetic separation solution-aspiration mechanism and a substrate injection mechanism.

In one embodiment, the magnetic separation unit comprises a magnetic separation solution-injection mechanism that comprises several magnetic separation solution-injection pins; and the magnetic separation units use a shared injection unit to drive the respective magnetic separation solution-injection mechanisms, the injection unit is respectively connected to one of the magnetic separation solution-injection pins through one switch valve, and the injection unit is further connected to a cleaning solution through one switch valve.

In one embodiment, the magnetic separation unit comprises a magnetic separation solution-aspiration mechanism that comprises several solution-aspiration pins; and the magnetic separation units use a shared peristaltic pump to drive the respective solution-aspiration mechanisms, and each of the solution-aspiration pins is connected to one channel of the peristaltic pump; or else each of the magnetic separation units is provided with a peristaltic pump to drive the respective magnetic separation solution-aspiration mechanism, and each of the solution-aspiration pins is connected to one channel of the peristaltic pump. In one embodiment, the automatic analysis apparatus further comprises a waste solution aspiration unit used to aspirate the reaction solution in the reaction cup that has been measured; and the waste solution aspiration unit comprises a waste solution aspiration pin that is connected to one channel of the peristaltic pump. It can be designed in time sequence to ensure that the waste solution aspiration action time of the waste solution aspiration unit is within the magnetic separation solution-aspiration action time.

In one embodiment, the magnetic separation unit comprises a substrate injection mechanism that comprises a substrate injection pin; and the magnetic separation units use a shared injection unit to drive the respective substrate injection machines, the substrate injection pins are respectively connected to the injection unit through a switch valve, the injection unit is further successively connected to substrate bottles through a substrate aspiration valve and a substrate bottle change-over valve, and the substrate bottle change-over valve is used to select which substrate bottle is to be connected.

A specific structure of mechanism of the magnetic separation unit of the present disclosure is provided below, taking a magnetic separation unit for four-stage magnetic separation cleaning as an example for illustration.

Referring to FIGS. 3, 4, 5, 6 and 7, the figure illustrates a magnetic separation plate 901, a magnetic separation solution-aspiration board 902, a magnetic separation solution-injection board 903, a magnetic separation plate driving motor 904, a magnetic separation solution-aspiration board vertical driving motor 905, a reaction cup mixing belt 906, a magnetic separation compartment 907, a magnetic separation unit transferring operation station 911, a first-stage magnetic separation solution-aspiration pin 931, a second-stage magnetic separation solution-aspiration pin 932, a third-stage magnetic separation solution-aspiration pin 933, a fourth-stage magnetic separation solution-aspiration pin 934, a first-stage magnetic separation solution-injection pin 941, a second-stage magnetic separation solution-injection pin 942, a third-stage magnetic separation solution-injection pin 943, a fourth-stage magnetic separation solution-injection pin 944, a substrate injection pin 945, a magnetic separation solution-injection syringe 940, a magnetic separation solution-aspiration peristaltic pump 930, a substrate syringe 950, a substrate injection valve 951, a substrate bottle change-over valve 952 and a substrate aspiration valve 953. The reaction cup mixing belt 906 can be used to simultaneously perform mixing on cup stations for second-stage solution injection, third-stage solution injection, fourth-stage solution injection and substrate solution injection, magnets are distributed on the magnetic separation compartment 907 as desired, and the substrate bottle 908 may be a bottom-piercing substrate bottle.

Two four-stage magnetic separation units are taken as an example for illustration of a shared design of a fluid path thereof.

Figure 5:
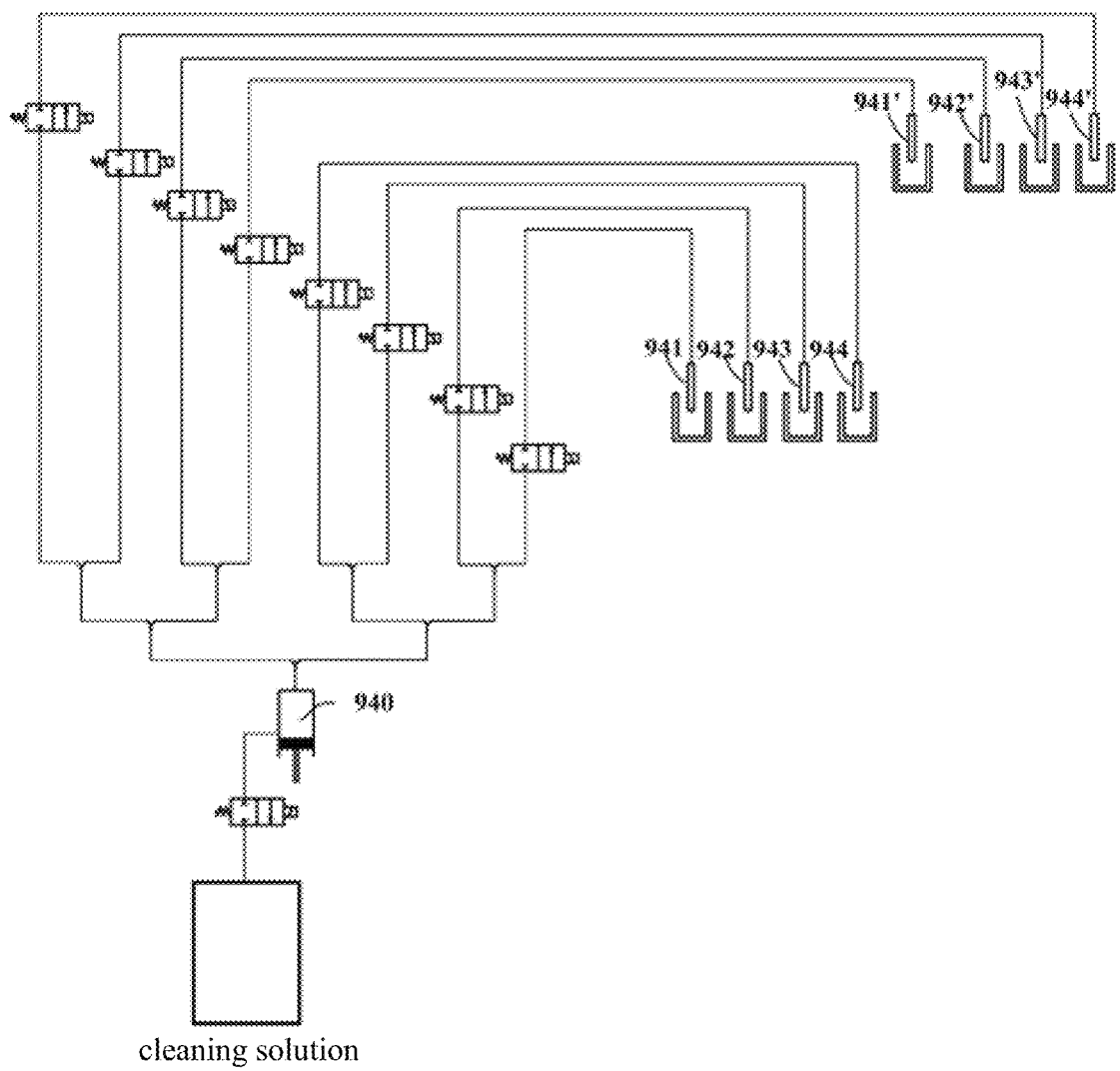
FIG. 5 is a fluid path diagram of a magnetic separation solution-injection mechanism of the magnetic separation unit of one embodiment.

Referring to FIG. 5, a shared fluid path design for two magnetic separation solution-injection mechanisms is illustrated. Since it is a four-stage magnetic separation unit, each of the magnetic separation units comprises four solution-injection pins, e.g., one of the magnetic separation units comprises solution-injection pins 941, 942, 943, 944, and the other magnetic separation unit comprises solution-injection pins 941', 942', 943', 944'. Through one syringe 940, coordinated with eight valves, by means of time sequence controlling, it is possible to realize a solution injection action by eight solution-injection pins.

Figure 6:
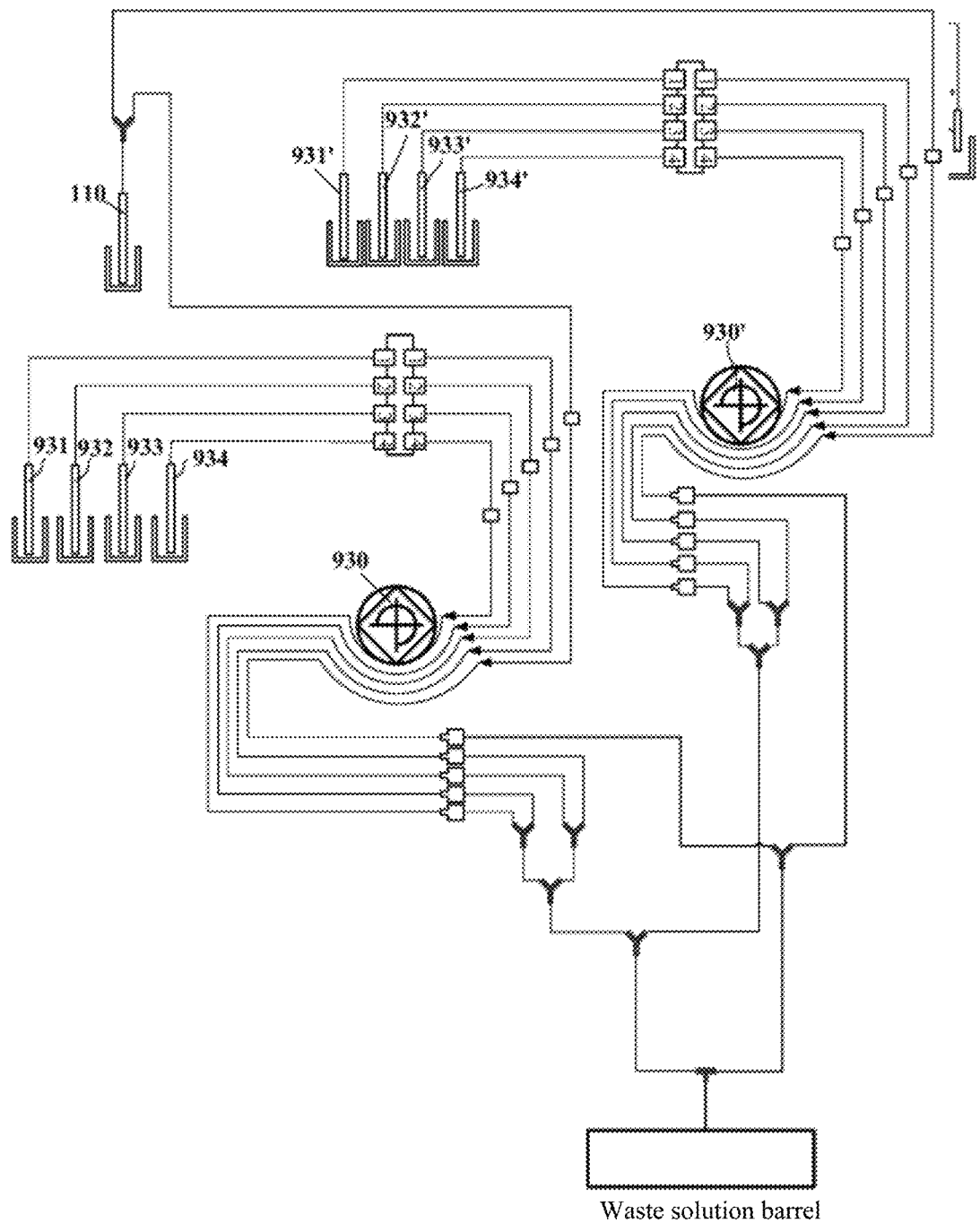
FIG. 6 is a fluid path diagram of a magnetic separation solution-aspiration mechanism and a waste solution aspiration unit of a magnetic separation unit of one embodiment.

Referring to FIG. 6, a shared fluid path design for a waste solution aspiration unit and a magnetic separation solution-aspiration mechanism is illustrated. Two peristaltic pumps are used. Since it is a four-stage magnetic separation unit, each of the magnetic separation units comprises four solution-aspiration pins, e.g., one of the magnetic separation units comprises solution-aspiration pins 931, 932, 933, 934, and the other magnetic separation unit comprises solution-aspiration pins 931', 932', 933', 934'. A peristaltic pump solution aspiration scheme is used in this embodiment. Considering that a peristaltic pump pipe does not have a long service life and needs to be replaced regularly, in order to prolong the replacement cycle and save maintenance costs, in the case of two solution-aspiration mechanisms, two 5-channel peristaltic pumps can be used to realize the solution aspiration action using eight solution-aspiration pins, and at the same time, one extra path of each solution-aspiration peristaltic pump is connected to a waste solution aspiration pin 110 in a waste solution aspiration unit to synchronously realize aspiration of the waste solution in the reaction cup after photometry, thereby further saving costs.

Figure 7:
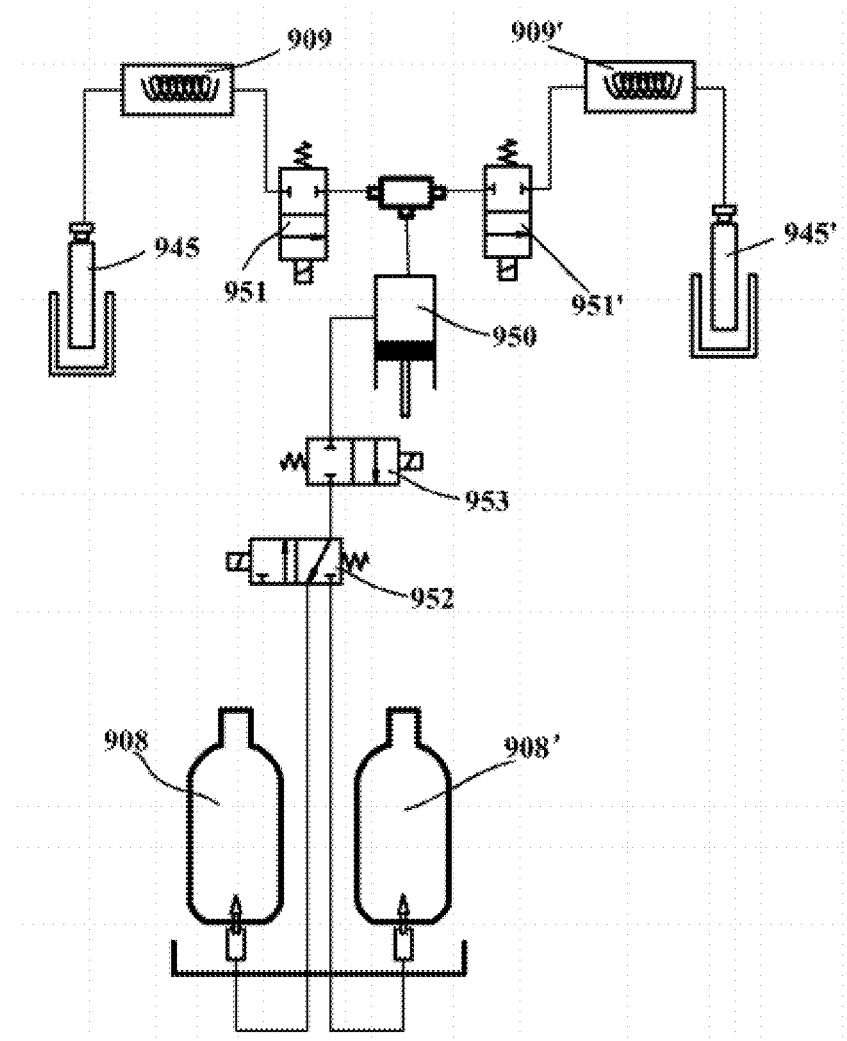
FIG. 7 is a fluid path diagram of a substrate injection mechanism of a magnetic separation unit of one embodiment.

Referring to FIG. 7, a shared fluid path design for the substrate injection mechanism is illustrated. One substrate syringe 950 is used, any substrate bottle 908 or 908' is selected by means of the substrate change-over valve 952 and then the substrate aspiration valve 953 is opened to aspirate a desired amount of the substrate, and then the substrate aspiration valve 953 is closed and any substrate injection valve 951 or 951' is opened, such that the magnetic separation unit to be injected is selected, and the substrate is injected into a reaction cup by means of the substrate injection pin 945 or 945'.

The transfer mechanism is used to at least transfer a reaction cup between the reaction cup loading mechanism 1, the reaction plate 4, the mixing mechanism and the magnetic separation unit.

The control unit is used to at least control operations and a time sequence of the sample dispensing mechanism 3, the reagent unit 5, the reagent dispensing mechanism 6, the reaction plate 4, the mixing mechanism, the measurement unit 10, the magnetic separation unit(s) and the transfer mechanism.

A one-step test project is taken as an example for illustration of the cooperation between the mechanisms and units mentioned above. Under control of the control unit, a reaction cup is transferred by the transfer mechanism from a cup assignment station of the reaction cup loading mechanism 1 to a sample addition station, a sample is aspirated from the sample unit 33 by the sample dispensing mechanism 3 and is then discharged into a reaction cup at the sample addition station, wherein the sample addition station may be arranged inside the reaction plate 4, i.e., the sample addition station is one placement station in the reaction plate 4, or the sample addition station may also be arranged outside the reaction plate 4. When the sample addition station is located outside the reaction plate 4, the reaction cup that is located at the sample addition station and has been added with a sample is transferred to the reaction plate 4 by the transfer mechanism, the reagent is discharged into the reaction cup inside the reaction plate 4 by the reagent dispensing mechanism 6, the reaction cup is then transferred by the transfer mechanism from the reaction plate 4 to the mixing mechanism for performing the mixing operation, the reaction cup is then further transferred by the transfer mechanism from the mixing mechanism back to the reaction plate 4 for incubation, the reaction cup after incubation is further transferred by the transfer mechanism from the reaction plate 4 to the magnetic separation unit for performing magnetic separation cleaning, and the reaction cup after magnetic separation cleaning is transferred out by the transfer mechanism from the magnetic separation unit for the final measurement. In one embodiment, the reaction plate 4 may have a measurement station, and if the measurement unit 10 is an optical measurement unit, accordingly, the reaction plate 4 has an optical measurement station. In this case, the above reaction cup after magnetic separation cleaning is transferred by the transfer mechanism from the magnetic separation unit back to the reaction plate 4, and when the reaction cup is transferred by the reaction plate 4 to the optical measurement station thereof, the reaction cup is subjected to optical measurement by the optical measurement unit.

For the scheduling of the reaction cup in the whole process of test, several positions associated with scheduling can be provided in the reaction plate 4, and the positions may be placement stations in the reaction plate 4. In one embodiment, the reaction plate 4 is provided with a reagent addition station, a first front operation station and a first rear operation station which are located at the outer circle portion, and a second rear operation station located at the inner circle portion, which will be specifically illustrated below.

When the sample addition station is located inside the reaction plate 4, the first front operation station is used to receive the reaction cup that is transferred by the transfer mechanism from the cup assignment station to the reaction plate 4, and when the sample addition station is located outside the reaction plate 4, the first front operation station is used to receive the reaction cup that is transferred by the transfer mechanism from the sample addition station to the reaction plate 4. The first rear operation station is used to transfer, by the transfer mechanism, the reaction cup to the mixing mechanism, or receive the reaction cup that is transferred from the magnetic separation unit to the reaction plate by the transfer mechanism. The second rear operation station is used such that the reaction cup is transferred to the magnetic separation unit by the transfer mechanism, or used to receive the reaction cup that is transferred from the mixing mechanism to the reaction plate by the transfer mechanism. Of course, the functions of the operation stations mentioned above may also have other change forms, which can be changed and arranged according to actual conditions in the specific implementation.

For cooperating with the positions associated with scheduling in the reaction plate 4, in one embodiment, the transfer mechanism may comprise a first cup gripper 2 and a second cup gripper 7. In one embodiment, the first cup gripper 2 is configured such that the trajectory of motion passes a cup assignment station and a first front operation station, and when the sample addition station is located outside the reaction plate 4, a trajectory of motion of the first cup gripper 2 passes the sample addition station. The second cup gripper 7 is configured such that the trajectory of motion passes the first rear operation station, the second rear operation station, the mixing mechanism and the magnetic separation unit. In one embodiment, the first cup gripper 2 is of a three-dimensional moving structure or rotating structure, the second cup gripper 7 is of a three-dimensional moving structure or rotating structure. The scheduling between the above positions may also be arranged on the trajectory of motion of the corresponding cup gripper according to actual conditions.

When the sample addition station is located inside the reaction plate 4, the sample addition station and the first front operation station may be at the same position or at different positions; and when the sample addition station is located outside the reaction plate 4, the reagent addition station and the first front operation station may be at the same position or at different positions.

Figure 11:
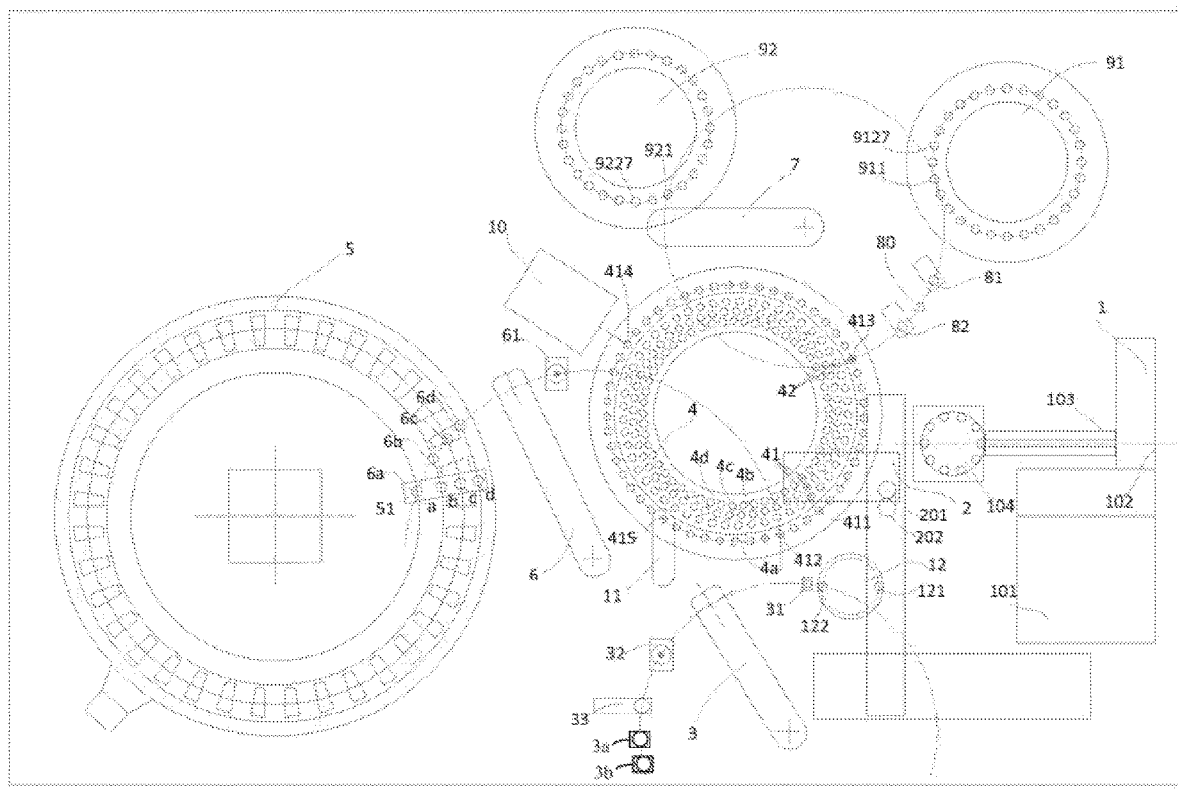
FIG. 11 is a structural schematic diagram of an automatic analysis apparatus of still another embodiment.

Taking the case where the reagent addition station and the first front operation station are not located at the same position when the sample addition station is located outside the reaction plate 4 as an example, e.g., in FIG. 11, the scheduling and cooperation between the positions from the perspective of a test process of a one-step test project.

Under control of a control unit, one reaction cup is transferred by the first cup gripper 2 from the cup assignment station of the reaction cup loading mechanism 1 to the sample addition station 31, a sample is aspirated from the sample unit 33 by the sample dispensing mechanism 3, and the aspirated sample is then discharged into an reaction cup at the sample addition station 31; the reaction cup after sampling is then transferred by the first cup gripper 2 from the sample addition station 31 to the first front operation station 411 in the reaction plate 4, the reaction cup is transferred by the reaction plate 4 from the first front operation station 411 to the reagent addition station 412, and a reagent is aspirated by the reagent dispensing mechanism from the reagent aspiration station of the reagent unit 5 and is then discharged into a reaction cup at the reagent addition station 412; the reaction cup is then transferred by the reaction plate 4 to the first rear operation station 413, and the reaction cup is transferred by the second cup gripper 7 from the first rear operation station 413 of the reaction plate 4 to the mixing mechanism, e.g., one of the mixing mechanisms 81, 82, to perform the mixing operation; after the mixing operation, the reaction cup is then transferred by the second cup gripper 7 from the mixing mechanism to the second rear operation station 42 of the reaction plate to perform incubation; after the incubation, when the reaction cup is not at the second rear operation station 42, the reaction cup is transferred by the reaction plate 4 inside the reaction plate, the reaction cup is first transferred to the second rear operation station 42, and the reaction cup is then transferred by the second cup gripper 7 from the second rear operation station 42 to the magnetic separation unit for performing magnetic separation cleaning, e.g., one of the magnetic separation units 91, 92; after the magnetic separation cleaning, the reaction cup is then transferred by the second cup gripper 7 from the magnetic separation unit to the first rear operation station 413 of the reaction plate; then, in a predetermined substrate incubation period, the reaction cup may be just transferred by the reaction plate 4 to the measurement station 414 to perform measurement by the measurement unit 10; and then, the reaction cup is transferred by the reaction plate 4 from the measurement station 414 to the waste solution aspiration station 415, the waste solution in the reaction cup at the waste solution aspiration station 415 is aspirated by the waste solution aspiration unit 11, the reaction cup is then transferred by the reaction plate 4 from the waste solution aspiration station 415 to the first front operation station 411, and then the first cup gripper 2 performs a cup discarding operation on the reaction cup, e.g., the reaction cup is discarded by the first cup gripper 2 from the first front operation station 411 to one of cup discarding holes 201, 202, the cup discarding hole 201 is coupled to a receiving apparatus containing waste cups, e.g., a waste tank 202 is also coupled to a receiving apparatus containing waste cups, the first cup gripper 2 can be controlled by the control unit to discard the reaction cup to be discarded from the first front operation station 411 to the cup discarding hole 201, and when the receiving apparatus, for containing waste cups, coupled to the cup discarding hole 201 is filled up, the control unit informs a user to replace the receiving apparatus and control the first cup gripper 2 to discard the reaction cup to be discarded from the first front operation station 411 to the cup discarding hole 202. The reaction cup that has finished the magnetic separation cleaning is added with a substrate and is measured. In one embodiment, the addition of a substrate to the reaction cup may be performed at the magnetic separation unit. In one embodiment, the addition of a substrate to the reaction cup may be performed at the reaction plate 4, and accordingly, a substrate addition station may be provided on the reaction plate 4.

As described above, in the automatic analysis apparatus, some units and mechanisms are controlled by the control unit to perform corresponding operations according to the time sequence. In general, the operations are based on the operations of the units and mechanisms, with the cycle mentioned above as the unit. For example, after the cycle is set to be a specific period, the units and mechanisms need to complete one or more predetermined actions or operations within such unit time of the cycle.

For the reaction cup loading mechanism 1, it is necessary to ensure that there is a reaction cup in/at the cup assignment station in each cycle, e.g., in one cycle, after a cup at the cup assignment station is transferred away, a new reaction cup is to be supplied and carried to the cup assignment station by the reaction cup loading mechanism 1.

For the sample dispensing mechanism 3, it is necessary to at least complete, in one cycle, a set of actions from sample aspiration to sample discharge into the reaction cup at the sample addition station, e.g., a sample aspiration operation, a sample discharge operation, etc.

For the reagent unit 5, it is necessary to complete, in one cycle, scheduling the reagent to be discharged into the reaction cup at the reagent station to the reagent aspiration station so that the reagent dispensing mechanism 6 performs aspiration. For the reagent dispensing mechanism 6, it is necessary to at least complete, in one cycle, a set of actions from reagent aspiration to reagent discharge into the reaction cup at the reaction addition station, e.g., a reaction aspiration operation, a reaction discharge operation, etc.

For the reaction plate 4, it is necessary to complete, in one cycle, a preset rotation stopping action to perform scheduling on the reaction cup, e.g., the reaction cup that needs reagent addition is transferred to the reagent addition station, and the reaction cup that has been added with a reagent is transferred from the reagent addition station to the first rear operation station, etc.

For the mixing mechanism, it is necessary to complete the mixing operation in one cycle.

The measurement operation is completed by the measurement unit 10 in one cycle.

When N magnetic separation units are provided, each of the magnetic separation units needs to advance by one cup station in N cycles, e.g., the reaction cup is rotated from the placement station thereof to the next adjacent placement station. When two magnetic separation units are provided, each of the magnetic separation units needs to advance by one cup station in two cycles.

The waste solution aspiration unit 11 completes a waste solution aspiration operation on the reaction cup at the waste solution aspiration station.

The transfer mechanism is used to coordinate with the cycles of the mechanisms and units to transfer the reaction cup.

Taking the automatic analysis apparatus in FIG. 2 as an example, it can achieve the shortest cycle of 7.5 seconds in the industry, and accordingly the test speed is also very fast and is increased. At the moment/this time, the reaction cup loading mechanism 1, the first cup gripper 2, the sample dispensing mechanism 3, the reaction plate 4, the reagent unit 5, the reagent dispensing mechanism 6, the second cup gripper 7, the mixing mechanisms 81 and 82, the measurement unit 10 and the waste solution aspiration unit 11 have a cycle of 7.5 seconds. However, since two magnetic separation units 91 and 92 are comprised, each of the magnetic separation units can receive one reaction cup at an interval of 15 seconds and advance by one cup station, and thus each of the magnetic separation units has an actual operating cycle of 15 seconds; and if at the moment one magnetic separation unit is provided, the magnetic separation unit also has a cycle of 7.5 seconds, and the plate body of the magnetic separation unit is made to be relatively large, such that the machining difficulty and costs are increased, and the magnetic separation is difficult to guarantee and even impossible to achieve. Since FIG. 11 illustrates two independently operating magnetic separation units 91 and 92, one of which receives a reaction cup in an odd-numbered cycle, and the other of which receives a reaction cup in an even-numbered cycle, which has no limitation to fixed operating steps, and can be not only used for the first step of magnetic separation cleaning but also used for the second step of magnetic separation cleaning, thereby significantly increasing the test speed and test throughput of the whole machine.

In one embodiment, the automatic analysis apparatus further comprises a temporary storage portion, which is arranged independent from the reaction plate 4 and used to receive and temporarily store the reaction cup that is transferred from the reaction plate 4 by the transfer mechanism. The temporary storage portion is arranged independent from the reaction plate 4, which means that the operation of the temporary storage portion does not disturb the rotation of the reaction plate 4 itself. In one embodiment, the temporary storage portion is arranged outside the reaction plate 4 in a separated manner, e.g., the temporary storage portion 12 in FIG. 2.

In one embodiment, the reagent dispensing mechanism 6 is configured to discharge a preset number of types of reagent into the reaction cup at the reagent addition station at most each time. When the number of types of reagent to be added to the reaction cup at the reagent addition station in this incubation is greater than the above preset number, after the reagent dispensing mechanism 6 is controlled by the control unit to add a preset number of types of reagent to the reaction cup, the reaction cup is transferred to the temporary storage portion by the transfer mechanism to perform temporary storage, and the reaction cup is then transferred from the temporary storage portion back to the reaction plate 4 to continue adding other reagents needed for this incubation. Of course, if the reaction cup is transferred back to the reaction plate 4 and the number of types of other reagents needed for this incubation at the reagent addition station is still greater than the above preset number, after the reagent dispensing mechanism 6 is controlled by the control unit to add a preset number of types of reagent to the reaction cup, the reaction cup is transferred to the temporary storage portion by the transfer mechanism to perform temporary storage, and the reaction cup is then transferred from the temporary storage portion back to the reaction plate 4 to continue adding other reagents needed for this incubation, i.e., the preset number of types of reagent to be added to the reaction cup at the reagent addition station at most each time.

For "the control unit controlling the reagent dispensing mechanism 6 to add a preset number of types of reagents to the reaction cup, the reaction cup is transferred to the temporary storage portion by the transfer mechanism to perform temporary storage", in one embodiment, a reaction cup is firstly transferred from the reagent addition station to the mixing mechanism, subjected to a non-mixing operation by the mixing mechanism, then transferred back to the incubation position of the reaction plate 4, and transferred from the reaction plate 4 to the temporary storage portion to perform temporary storage without being incubated for a period of time. By means of the above process, a multi-component test project can be divided into several new one-step test processes to re-enter a test sequence and process, but it does not need to undergo magnetic separation cleaning and actual mixing and incubation.

However, for the existing multi-component reagent test project, as described above, in order to shorten the time for dispensing reagents, a scheme in which multiple reagent dispensing units arranged in parallel or series is generally used, so that the cost of whole machine is increased, the size of the whole machine is increased, and for most two-component projects, design of multiple reagent dispensing units is a redundant design. In one embodiment, the reagent dispensing mechanism 6 comprises one reagent pin, which can be configured to aspirate and discharge two reagents at most in one cycle, e.g., continuously aspirating two reagents and then discharging them together. When more than two reagents are provided, the temporary storage portion is used, and the reaction cup after adding the two reagents is placed in the temporary storage portion and then transferred back to the reaction plate 4 as a new one-step test to enter the process, which can not only ensure the smooth operation of the automatic analysis apparatus at high speed, but also realize the addition of multi-component reagents. The reaction plate is generally arranged inside a reaction kettle, and the reaction kettle has a reaction plate cover used to cover the reaction plate for heat preservation on the incubation position inside the reaction plate. However, in the scheme of multiple reagent dispensing units in the related art, more holes are generally needed to be provided above the reaction plate, thereby causing the loss of temperature control effect of the reaction plate and increasing the energy loss.

When a test project for any reaction cup is a multi-step test project, in any step of test other than the last step of test, when the reaction cup needs to be performed magnetic separation cleaning in this step of test, the reaction cup after incubation in the reaction plate 4 is firstly transferred to the magnetic separation unit by the transfer mechanism to perform magnetic separation cleaning, and then the reaction cup after magnetic separation cleaning is transferred from the magnetic separation unit to the temporary storage portion to perform temporary storage; when the reaction cup in this step of test does not need to be performed magnetic separation cleaning, the reaction cup after incubation in the reaction plate 4 is transferred from the reaction plate 4 to the temporary storage station by the transfer mechanism to perform temporary storage; and the reaction cup temporarily stored in the temporary storage portion is then transferred back to the reaction plate to complete the subsequent steps of test. When the magnetic separation unit is arranged outside the reaction plate 4 in a separated manner, the reaction cup after magnetic separation cleaning is transferred from the magnetic separation unit to the temporary storage portion by the transfer mechanism to perform temporary storage, the reaction cup is firstly transferred from the magnetic separation unit to the reaction plate 4, and the reaction cup is then transferred from the reaction plate 4 to the temporary storage portion. By means of the above process, a multi-step test project can be divided into several similar one-step test processes to re-enter a test sequence and process, which can not only ensure the smooth operation of the automatic analysis apparatus at high speed, but also realize a multi-step test project.

After a temporary storage portion is introduced, a multi-component test project can be divided into several processes similar to the one-step test process, and a multi-step test process can be divided into several new one-step test processes and re-enter the test sequence and process, so that the mechanisms and units and the control sequence can be designed according to a one-step test process, which is very standardized and orderly, so as to solve the problem that multi-component test projects and multi-step test processes disturb normal processes, thereby effectively increasing the test speed and test throughput of the whole machine.

The temporary storage portion can also solve the problem that the sample pre-dilution or pre-treatment process disturbs the normal processes. In one embodiment, the sample addition station is arranged outside the reaction plate 4; and after a diluent or a pretreatment solution is added to the reaction cup at the reagent addition station by the reagent dispensing mechanism 6, the reaction cup is transferred from the reaction plate 4 to the temporary storage portion by the transfer mechanism to perform temporary storage, the diluted or pretreated sample is aspirated from the reaction cup by the sample dispensing mechanism 3 and discharged into a reaction cup at the sample addition station at the moment, and the transfer mechanism then performs the cup discarding operation on the reaction cup at the temporary storage portion. In one embodiment, the temporary storage portion has at least two temporary storage stations, and comprises a rotatable circular plate used to transfer a reaction cup between the temporary storage stations. For example, as shown in FIG. 2, the temporary storage portion 12 comprises at least two temporary storage stations 121 and 122, and taking an example in which 121 is a first temporary storage station, and 122 is a second temporary storage station, the first temporary storage station 121 of the temporary storage portion 12 is used to receive a reaction cup that is transferred from the reaction plate 4 by the transfer mechanism, and then the reaction cup is transferred to the second temporary storage station 122 by the temporary storage portion 12, so that the unoccupied first temporary storage station 121 can further receive a reaction cup that is transferred from the reaction plate 4 by the transfer mechanism.

When the reaction cup transferred to the second temporary storage station 122 further needs to perform a subsequent test, the reaction cup at the second temporary storage station 122 is transferred back to the reaction plate 4 by the transfer mechanism, and when the reaction cup transferred to the second temporary storage station 122 is the reaction cup to which the diluent or pretreatment solution is added by the reagent dispensing mechanism when the reaction cup is previously at the reagent addition station, the diluted or pretreated sample is aspirated from the reaction cup by the sample dispensing mechanism 3 and is discharged into the reaction cup at the sample addition station at the moment, and the transfer mechanism then performs the cup discarding operation on the reaction cup at the second temporary storage station 122; or else, after a preset period of time, e.g., after one cycle, the reaction cup is then transferred from the second temporary storage station 122 back to the first temporary storage station 121 by the temporary storage portion 12, if the reaction cup needs to perform a subsequent test, the reaction cup is transferred back to the reaction plate by the transfer mechanism, and if a sample is aspirated from the reaction cup at the second temporary storage station, the transfer mechanism performs the cup discarding operation on the reaction cup at the first temporary storage station at the moment, e.g., the reaction cup is discarded into the cup discarding hole 202 or 201.

A reaction cup scheduling relationship is provided between the temporary storage portion and the reaction plate 4, and in one embodiment, the first front operation station of the reaction plate 4 is further used to transfer out, by the transfer mechanism, the reaction cup that needs to be transferred from the outer circle portion to the temporary storage portion, or used to receive the reaction cup that is transferred from the temporary storage portion to the reaction plate by the transfer mechanism. In one embodiment, the reaction plate 4 further comprises a second front operation station that is used to transfer out, by the transfer mechanism, the reaction cup that is to be transferred from the inner circle portion to the temporary storage portion. Accordingly, the first cup gripper 2 is configured such that a trajectory of motion thereof passes the cup assignment station, the temporary storage portion, the sample addition station, the first front operation station and the second front operation station; and the second cup gripper 7 is configured such that a trajectory of motion passes the first rear operation station, the second rear operation station, the mixing mechanism and the magnetic separation unit. When the temporary storage portion comprises at least two temporary storage stations, the transfer mechanism can be configured such that the trajectory of motion thereof passes one of the temporary storage stations, e.g., the first cup gripper 2 passes the first temporary storage station 121.

Taking FIG. 2 as an example, after being configured in this way, a certain reaction cup is transferred from the incubation position in the reaction plate 4 to the temporary storage portion, the reaction cup in the inner circle portion is firstly transferred by the reaction plate 4 to the first front operation station, e.g., the first front operation station 411 in FIG. 2, and the reaction cup is then transferred from the first front operation station to the temporary storage portion by the first cup gripper 2. A certain reaction cup is transferred from the magnetic separation unit to the temporary storage portion, then the reaction cup is firstly transferred from the magnetic separation unit to the first rear operation station 413 of the reaction plate 4 by the second cup gripper 7, the reaction cup is then transferred from the first rear operation station 413 to the first front operation station 411 by the reaction plate 4, and the reaction cup is then transferred from the first front operation station 411 to the temporary storage portion by the first cup gripper 2. In one embodiment, the automatic analysis apparatus further comprises a transitional temporary storage portion; the first front operation station is further used to discard, by the transfer mechanism, the reaction cup that has been measured by the measurement unit 10; when the control unit detects that the reaction cup that has been measured is not discarded at the first front operation station by the transfer mechanism, the transfer mechanism is controlled by the control unit to stop scheduling the reaction cup from the temporary storage portion or the sample addition station to the first front operation station; and when the above reaction cup that has been measured but has not been discarded at the first front operation station is transferred to the first rear operation station by the reaction plate, if a reaction cup after magnetic separation cleaning by the magnetic separation unit needs to be transferred to the reaction plate at the moment, the reaction cup after cleaning by the magnetic separation unit is firstly transferred to the transitional temporary storage portion by the transfer mechanism, and when the control unit detects that the first rear operation station is unoccupied, the reaction cup at the transitional temporary storage portion is then transferred to the first rear operation station by the transfer mechanism.

In one embodiment, the automatic analysis apparatus further comprises a transitional discarding portion; the first front operation station is further used to discard, by the transfer mechanism, the reaction cup that has been measured by the measurement unit 10; when the control unit detects that the reaction cup that has been measured is not discarded at the first front operation station by the transfer mechanism, the transfer mechanism is controlled by the control unit to stop scheduling the reaction cup from the temporary storage portion or the sample addition station to the first front operation station; and when the above reaction cup that has been measured but has not been discarded at the first front operation station is transferred to the first rear operation station by the reaction plate, the reaction cup is transferred to the transitional discarding portion by the transfer mechanism to perform discarding. Taking FIG. 2 as an example, the component marked as 80 in FIG. 2 may be the transitional temporary storage portion or the transitional discarding portion to perform a discarding operation.

As described above, since a temporary storage portion is introduced, a multi-component test project can be divided into several processes similar to the one-step test process, and a multi-step test project can be divided into several new one-step test processes and re-enter the test sequence and process, so that the mechanisms and units and the control sequence can be designed according to a one-step test process, which is very standardized and orderly, so as to solve the problem that multi-component test projects and multi-step test processes disturb normal processes, thereby effectively increasing the test speed and test throughput of the whole machine. A multi-component test project is divided into several similar one-step test processes, and a multi-step test process is divided into several new one-step test processes. In the new divided one-step test processes, some need to perform magnetic separation cleaning, but some do not need to perform magnetic separation cleaning. However, since the reaction plate is a core area in the whole test process, regardless of whether a certain one-step test process is subjected to magnetic separation cleaning, it will not disrupt the motion of the reaction plate in one cycle, so that the other mechanisms and units that coordinate with the reaction plate will not be disrupted, so the whole machine is very orderly and can operate at high speed.

In addition, since the temporary storage portion is introduced, a multi-component test project is divided into several similar one-step test processes, a multi-step test project is divided into several new one-step test processes, each of the new one-step test processes are further divided into several operations on a reaction cup, and the operations on the same reaction cup are not all continuous in time sequence, e.g., in a traditional scheme, when multiple reagents are added, the reagents are respectively added to the reaction cup continuously in time sequence. Moreover, in the present disclosure, after the temporary storage portion is introduced, part of the reagents is firstly added to the reaction cup, and the reaction cup is then used to perform a one-step test process, enters the temporary storage portion after several cycles, and then enters from the temporary storage portion to the reaction plate and is added with reagents. In the several cycles of the reaction cup, some other reaction cups are all successively added with the reagent, e.g., a first reaction cup is added with the reagent in a first cycle, a second reaction cup is added with the reagent in a second cycle, a third reaction cup is added with the reagent in a third cycle, . . . , the first reaction cup is added with the remaining reagent(s) in a certain cycle, as such in the overall time sequence, there is a reaction cup to be added with the reagent in each cycle, which significantly shortens the cycle of reagent addition and improves the efficiency of reagent addition.

Taking the automatic analysis apparatus in FIG. 2 as an example, it can be seen that in the automatic analysis apparatus, the reaction plate 4 is located in a relatively central position, and other mechanisms and units are designed around the reaction plate 4, which can make full use of the table space of the automatic analysis apparatus. The structure of the reaction plate 4 and the motion thereof in one cycle will be described in detail below.

Taking FIG. 2 as an example, the reaction plate 4 in FIG. 2 has four circles of tracks, each of which has 53 reaction cup placement stations (cup stations). The outermost circle of track is configured as an outer circle portion, and the inner circles of tracks are configured as an inner circle portion. In one embodiment, in order to simplify the structural design and ensure the consistency of temperature control, the four circles of tracks are integrally formed, one temperature control unit is used, and the inner and outer circles are driven by one electric motor. As shown in FIG. 2, since the inner circle portion comprises three circles of tracks 4b, 4c, 4d, it can be seen that both the first cup gripper 2 and the second cup gripper 7 pass one placement station on the three circles of tracks 4b, 4c, 4d, and therefore one or more second front operation stations 41 may be provided; similarly, one or more second rear operation stations may be provided; and when multiple second rear operation stations 42 are provided, scheduling the reaction cup to the second rear operation stations 42 means that the reaction cup is transferred to any one unoccupied placement station in/of the multiple second rear operation stations 42.

When the reaction plate 4 is in one cycle, the overall effect of motion is: a reaction cup at the first front operation station 411 is firstly transferred to the reagent addition station 412 so that the reagent dispensing mechanism 6 performs a reagent addition operation, and the reaction cup after reagent addition is then transferred from the reagent addition station 412 to the first rear operation station 413 so that the reaction cup is transferred from the first rear operation station 413 to the mixing mechanism 81 or 82 by the second cup gripper 7. As described above, the overall effect of motion of the reaction plate 4 in one cycle is: the reaction cup is successively transferred from the first front operation station 411 to the reagent addition station 412 and then transferred to the first rear operation station 413. Since it also needs to coordinate with the temporary storage portion, some other rotation stopping actions for the reaction plate are added in the overall effect of motion to coordinate with temporary storage portion, etc. However, these other rotation stopping actions will not affect the overall effect of motion of the reaction plate 4 in one cycle. In summary, the reaction plate 4 successively has four rotation stopping actions. By these four rotation-stopping actions, the cooperation with the temporary storage portion, etc. can be achieved while realizing the overall effect of motion. The time sequence of the four rotation stopping actions in one cycle successively comprises a first rotation stopping action, a second rotation stopping action, a third rotation stopping action and a fourth rotation stopping action, and the four rotation stopping actions will be described below.

In the first rotation stopping action:

the reaction plate 4 stops for the first time, and the reaction cup that is located at the reagent addition station 412 and has been added with a diluent or a pretreatment solution is transferred from the reagent addition station 412 to the first front operation station 411 so that the reaction cup is transferred from the first front operation station 411 to the temporary storage portion 12 by the first cup gripper 2;

or else, the reaction plate 4 stops for the first time, and the reaction cup that is located on the inner circle portion and needs to be transferred to the temporary storage portion 12 is transferred to the second front operation station 41 so that the reaction cup is transferred from the second front operation station 41 to the temporary storage portion 12 by the first cup gripper 2, wherein the reaction cup that is located on the inner circle portion and needs to be transferred to the temporary storage portion 12 may be, for example, the reaction cup that needs to be added with the remaining reagent in a multi-component test project or may be the reaction cup that needs to be subjected to the subsequent step of test in a multi-step test project;

or else, the reaction plate 4 stops for the first time, and the reaction cup that is transferred from the magnetic separation unit to the first rear operation station 413 of the reaction plate 4 by the second cup gripper 7 is transferred from the first rear operation station 413 to the first front operation station 411 so that the reaction cup is transferred from the first front operation station 411 to the temporary storage portion 12 by the first cup gripper 2; and for example, it may be a certain step of test in the multi-step test project, in which magnetic separation cleaning is needed, the reaction cup after magnetic separation cleaning needs to perform the subsequent step of test and thus needs to be transferred from the magnetic separation unit to the temporary storage station, which is realized by means of the reaction plate.

After the first rotation stopping action of the reaction plate and before the second rotation stopping action, the reaction plate is stopped in this period of time, and the reaction cup is transferred from the first front operation station 411 to the temporary storage portion 12 by the first cup gripper 2, or the reaction cup is transferred from the second front operation station 41 to the temporary storage portion 12 by the first cup gripper 2. It should be noted that by means of the scheduling for all the test project, the two requirements "scheduling from the first front operation station 411 to the temporary storage portion 12" and "scheduling from the second front operation station 41 to the temporary storage portion 12" may not appear at the same time in each cycle, and at most only one of the two requirements can appear. In other words, there is at most one of the following three cases in one cycle:

a first case: the reaction cup that is located at the reagent addition station 412 and has been added with a diluent or a pretreatment solution is transferred from the reagent addition station 412 to the first front operation station 411 by means of the first rotation stopping action by the reaction plate 4, and at the moment the reaction cup needs to be transferred from the first front operation station 411 to the temporary storage portion 12 by the first cup gripper 2;

a second case: the reaction cup which needs to be transferred to the temporary storage portion 12 is provided on the inner circle portion of the reaction plate 4 and is firstly transferred to the second front operation station 41 by means of the first rotation stopping action by the reaction plate 4, and at the moment the reaction cup needs to be transferred from the second front operation station 41 to the temporary storage portion 12 by the first cup gripper 2; and a third case: for the reaction cup that is transferred from the magnetic separation unit to the first rear operation station 413 of the reaction plate 4 by the second cup gripper 7, if the reaction cup further needs to be subjected to the subsequent step of test (e.g., a reagent needs to be added) rather than being measured, the reaction plate 4 performs the first rotation stopping action, the reaction cup is transferred from the first rear operation station 413 to the first front operation station 411, and at the moment the reaction cup needs to be transferred from the first front operation station 411 to the temporary storage portion 12 by the first cup gripper 2.

In the second rotation stopping action, the reaction plate 4 stops for the second time, and the reaction cup that is located at the inner circle portion, has been incubated and is about to enter the magnetic separation cleaning is transferred to the second rear operation station 42 so that the reaction cup is transferred from the second rear operation station 42 to the magnetic separation unit 91 or 92 by the second cup gripper 7.

Similarly, after the second rotation stopping action of the reaction plate 4 and before the third rotation stopping action, the reaction plate is stopped in this period of time, and the reaction cup is transferred from the second rear operation station 42 to the magnetic separation unit by the second cup gripper 7.

In the third rotation stopping action, the reaction plate 4 stops for the third time, and the reaction cup that is located at the outer circle portion and waits to be added with the reagent is transferred to the reagent addition station 412 so that the reaction cup performs a reagent addition operation by the reagent dispensing mechanism 6.

Similarly, after the third rotation stopping action of the reaction plate 4 and before the fourth rotation stopping action, the reaction plate is stopped in this period of time, the aspirated reagent is at least discharged into the reaction cup at the reagent addition station 412 by the reagent dispensing mechanism in this period of time.

In the fourth rotation stopping action: the reaction plate 4 stops for the fourth time, and the reaction cup at the reagent addition station 412 after the third rotation stopping action is transferred to the first rear operation station 413 so that the reaction cup is transferred to the mixing mechanism by the second cup gripper 7.

The above four rotation stopping actions are all completed in one cycle.

In one cycle, if a reaction cup is to be transferred to the temporary storage portion, the reaction plate will perform the first rotation stopping action, otherwise the reaction plate will not perform the first rotation-stopping action;

in one cycle, if a reaction cup is to be delivered from the reaction plate to the magnetic separation unit to perform magnetic separation cleaning, the reaction plate will perform the second rotation stopping action, otherwise the reaction plate will not perform the second rotation stopping action;

in one cycle, if a reaction cup needs to perform reagent addition, the reaction plate will perform the third rotation stopping action, otherwise the reaction plate will not perform the third rotation stopping action;

in one cycle, if a reaction cup after reagent addition is to be delivered from the reaction plate to the mixing mechanism to perform the mixing operation, the reaction plate will perform the fourth rotation stopping action, otherwise the reaction plate will not perform the fourth rotation stopping action; and in general, after the apparatus test starts, a reaction cup needs to perform reagent addition and perform the mixing operation after reagent addition in each cycle, so there are the third rotation stopping action and the fourth rotation stopping action in each cycle, while whether the first rotation stopping action and the second rotation stopping action are performed is determined according to the actual needs of the reaction cup in each cycle.

Since there are both the third rotation stopping action and the fourth rotation stopping action in each cycle, due to the cooperation of the two rotation stopping actions, regardless of the reaction plate 4 performs the first rotation stopping action and/or the second rotation stopping action before the third rotation stopping action in this cycle, the number of advanced cup stations (placement stations) of the reaction plate 4 after the fourth rotation stopping action in this cycle is consistent as compared with that of the reaction plate after the fourth rotation stopping action in the last cycle, i.e., the reaction plate 4 advances a fixed number of cup stations in each cycle, e.g., as shown in FIG. 2, in each cycle, the reaction plate 4 advances 11 cup stations (placement stations) counterclockwise than the last cycle. Since the reaction plate 4 advances a fixed number of cup stations in each cycle, the time sequence can be designed such that when the reaction cup after magnetic separation cleaning in the magnetic separation unit and before measurement is transferred to the first rear operation station 413 of the reaction plate 4, the period needed to reach the measurement station is also fixed, the period from the completion of measurement at the measurement station to the waste solution aspiration station is also fixed, and the period from the waste solution station to the first front operation station 411 to perform the cup discarding treatment is also fixed.

Therefore, after the fourth rotation stopping action of the reaction plate 4 in this cycle and before the first rotation stopping action of the reaction plate 4 in the next cycle, the reaction plate is stopped in this period of time, and thus the cup gripper performs scheduling in this period of time so that some reaction cups are transferred out from the reaction plate 4, and some reaction cups are transferred from the outside to the reaction plate 4. In one embodiment, specifically in this period of time, other units and mechanisms may perform the following actions:

if a reaction cup to be measured is at the measurement station, the measurement unit 10 will complete the measurement on the reaction cup in this period of time;

if a reaction cup after measurement is at the waste solution aspiration station, the waste solution aspiration unit 11 performs the waste solution aspiration operation on the reaction cup;

if a reaction cup after measurement is at the first front operation station 411, the reaction cup is transferred from the first front operation station 411 to the cup discarding hole 201 or 202 by the first cup gripper 2 to perform cup discarding treatment; the reaction cup after sample addition at the sample addition station 31 is then transferred from the sample addition station 31 to the first front operation station 411 by the first cup gripper 2, or else, the reaction cup that is located at the temporary storage portion and needs to perform the subsequent test (e.g., reagent addition) is transferred from the temporary storage portion to the first front operation station 411 by the first cup gripper 2; it should be noted that by means of the scheduling for all the test projects, the two requirements "scheduling from the sample addition station 31 to the first front operation station 411" and "scheduling from the temporary storage portion to the first front operation station 411" may not appear at the same time in each cycle, and at most only one of the two requirements can appear;

if there is a reaction cup after the mixing operation, the reaction cup after the mixing operation is transferred from the mixing mechanism to the second rear operation station 42 of the reaction plate by the second cup gripper 7; the reaction cup located at the first rear operation station 413 is transferred to the mixing mechanism by the second cup gripper 7; and the reaction cup after magnetic separation cleaning is transferred from the magnetic separation unit to the first rear operation station 413 of the reaction plate 4 by the second cup gripper 7.

This cycle is after the fourth rotation stopping action of the reaction plate 4, and before the first rotation stopping action of the reaction plate 4 in the next cycle.

After the fourth rotation stopping action of the reaction plate 4 in this cycle and before the first rotation stopping action of the reaction plate 4 in the next cycle, in this period of time, the above measurement unit, the waste solution aspiration unit 11, the first cup gripper 2 and the second cup gripper 7 are arranged in parallel around the reaction plate 4.

As described above, there are generally the third rotation stopping action and the fourth rotation stopping action in each cycle, and the first rotation stopping action and the second rotation stopping action are performed according to the requirement of the reaction cup.

The function of the third rotation stopping action and the fourth rotation stopping action is to transfer the reaction cup to be added with a reagent to the reagent addition station to perform the reagent addition operation, and transfer the reaction cup after reagent addition to the first rear operation station so that the reaction cup is transferred to the mixing mechanism by the second cup gripper 7; the first rotation stopping action is reserved to divide a multi-component test project and a multi-step test project into several new one-step test processes; and the second rotation stopping action is used to transfer the reaction cup that has been incubated and needs to be performed magnetic separation cleaning to the magnetic separation unit. Therefore, from the perspective of each cycle, the reaction plate 4 comprises two fixed rotation stopping actions (the third rotation stopping action and the fourth rotation stopping action) and two possible rotation stopping actions (the first rotation stopping action and the second rotation stopping action), and the rotation stopping actions in each cycle are all as such and are very standardized, no other abnormal stopping will occur, and regardless of whether a certain one-step test process needs to perform magnetic separation cleaning, the rotation stopping action of the reaction plate 4 in each cycle will not be disturbed, because the second rotation stopping of the reaction plate 4 is reserved to determine whether it needs to perform magnetic separation cleaning. In addition, since both the two fixed rotation stopping actions (the third rotation stopping action and the fourth rotation stopping action) of the reaction plate 4 wait for the motion of the reagent plate and the reagent aspiration of the reagent dispensing mechanism, both the two fixed rotation stopping actions (the third rotation stopping action and the fourth rotation stopping action) of the reaction plate 4 are performed in a later period of time in one cycle. Since even the third rotation stopping action is performed at the beginning of one cycle, the reaction plate 4 still has to wait for the reagent aspiration and other operations of the reagent dispensing mechanism, taking this case into consideration, making full use of the period of time during which the reaction plate 4 wait for the reagent aspiration of the reagent dispensing mechanism, this period of time is reserved for the first rotation stopping action and the second rotation stopping action, so that it does not extend the period of each cycle. In addition, in the period reserved for the first rotation stopping action and the second rotation stopping action in each cycle, the multi-component test project and the multi-step test project are divided into some operations to be performed in several new one-step test processes. From the perspective of each cycle, it is equivalent to performing, in parallel in each cycle, the reagent addition operation and some operations to be performed in several new one-step test processes into which the multi-component test project and the multi-step test project is divided, so that the efficiency and speed are significantly increased, and the reaction plate and other mechanisms and units will not wait for or cannot complete the operations to be completed in the cycle due to the reagent addition operation or due to the some operations to be performed in several new one-step test processes into which the multi-component test project and the multi-step test project are divided.

The present disclosure further discloses an operating method for an automatic analysis (referred to as operating method below). In one embodiment, the automatic analysis apparatus involved in the operating method may be the automatic analysis apparatus disclosed in any one embodiment of the present disclosure. In one embodiment, the operating method comprises: after a test starts, controlling the magnetic separation units to receive the reaction cup in respective corresponding cycles, wherein when N magnetic separation units are provided, a reaction cup receiving cycle corresponding to the ith magnetic separation unit is a (kN+i)th cycle; where N is an integer greater than or equal to 2, k is an integer greater than or equal to 0, the value of i is in a range of 1 to N, and i is an integer. For example, three magnetic separation units are provided, including a first magnetic separation unit, a second magnetic separation unit and a third magnetic separation unit, so the reaction cup receiving cycle of the first magnetic separation unit is an arithmetic sequence of 1, 4, 7, 10 . . . , the reaction cup receiving cycle of the second magnetic separation unit is an arithmetic sequence of 2, 5, 8, 11 . . . , and the reaction cup receiving cycle of the third magnetic separation unit is an arithmetic sequence of 3, 6, 9, 12 . . . . In one embodiment, two magnetic separation units are provided, the two magnetic separation units are controlled to receive the reaction cup in the respective corresponding cycles, the reaction cup receiving cycle corresponding to one of the magnetic separation units is an odd-numbered cycle, and the reaction cup receiving cycle corresponding to the other magnetic separation unit is an even-numbered cycle. In one embodiment, the control unit may perform scheduling on all the test projects according to the related algorithm, so that at most one reaction cup that has been incubated and is about to perform separation cleaning will appear in each cycle, or else only one reaction cup that has been incubated and is about to perform separation cleaning will appear in each cycle, so that the magnetic separation units that operate independently can be utilized to the maximum extent.

In order to ensure that the automatic analysis apparatus can continue to be used when a fault occurs in any magnetic separation unit, the present disclosure refers to an operating method after a fault occurs. Fault detection can be divided into fault detection before the automatic analysis apparatus starts a test and fault detection during the test, which will be respectively described below.

Figure 8:
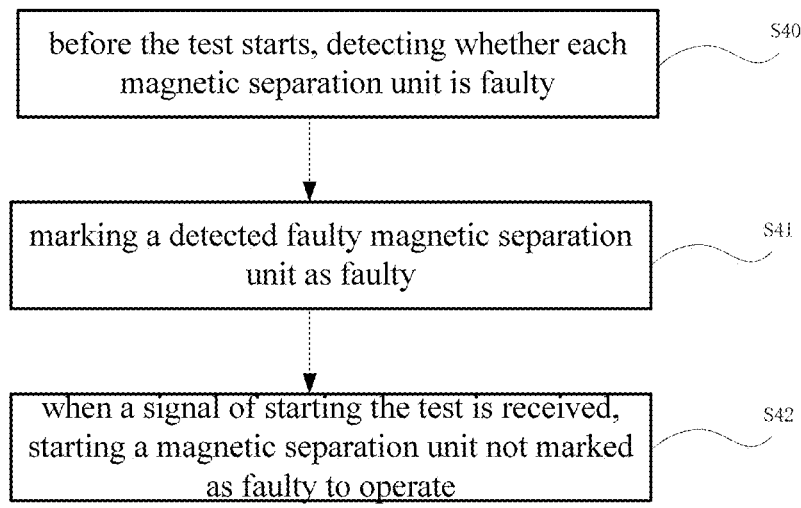
FIG. 8 is a first flow diagram of an automatic analysis operating method of one embodiment.

In one embodiment, referring to FIG. 8, the operating method further comprises steps S40 to S42.

Step S40: before the test starts, each magnetic separation unit is detected to determine whether it is faulty. There are many ways to detect whether the magnetic separation unit is faulty. For example, the magnetic separation unit will comprise several moving functional components, e.g., the magnetic separation plate driving motor 904, the magnetic separation solution-aspiration board vertical driving motor 905, the reaction cup mixing belt 906, the solution-aspiration pin of each stage, the solution-injection pin of each stage, the magnetic separation solution-injection syringe 940, the magnetic separation solution-aspiration peristaltic pump 930, and the substrate syringe 950 mentioned above. Each of the moving functional components is provided with a detection module to detect whether it can move in a normal way. Before the test starts, each moving functional component of each magnetic separation unit is controlled to move, and when the detection module of any magnetic separation unit detects that any of the moving functional components of the magnetic separation unit cannot move in a normal way, it indicates that the magnetic separation unit is faulty.

Step S41: the magnetic separation unit detected as having fault is marked as faulty.

Step S42: when a signal of starting a test is received, the magnetic separation unit not marked as faulty is started to operate. In one embodiment, the step in which/that the magnetic separation unit not marked as faulty is started to operate comprises: starting the magnetic separation unit not marked as faulty to receive a reaction cup in the corresponding reaction cup receiving cycle. In one embodiment, the step S42 further comprises: two magnetic separation units are provided; when only one of the magnetic separation units is not marked as faulty and is started to operate, the magnetic separation unit is controlled to receive a reaction cup in the corresponding cycle of receiving a reaction cup; and controlling the sample dispensing mechanism, the reagent unit and the reagent dispensing mechanism to coordinate with the operation of the magnetic separation unit not marked as faulty in an intermittent operation manner of operating for one cycle and then stopping operation for one cycle, such that the reaction cup that has been incubated and is about to perform magnetic separation cleaning is located in time sequence in the cycle of receiving a reaction cup corresponding to the magnetic separation unit not marked as faulty. For example, taking FIG. 11 as an example, when one of the magnetic separation units is faulty, the other magnetic separation unit not marked as faulty still receives a reaction cup in the corresponding reaction cup receiving cycle, and other mechanisms and units coordinate with the magnetic separation unit not marked as faulty to deliver the reaction cup that has been incubated and is about to perform magnetic separation cleaning to the first rear operation station 413 in the reaction cup receiving cycle corresponding to the magnetic separation unit not marked as faulty, so that the reaction cup is transferred from the first operation station 413 to the above magnetic separation unit not marked as faulty by the second cup gripper 7 to perform magnetic separation cleaning.

Figure 9:
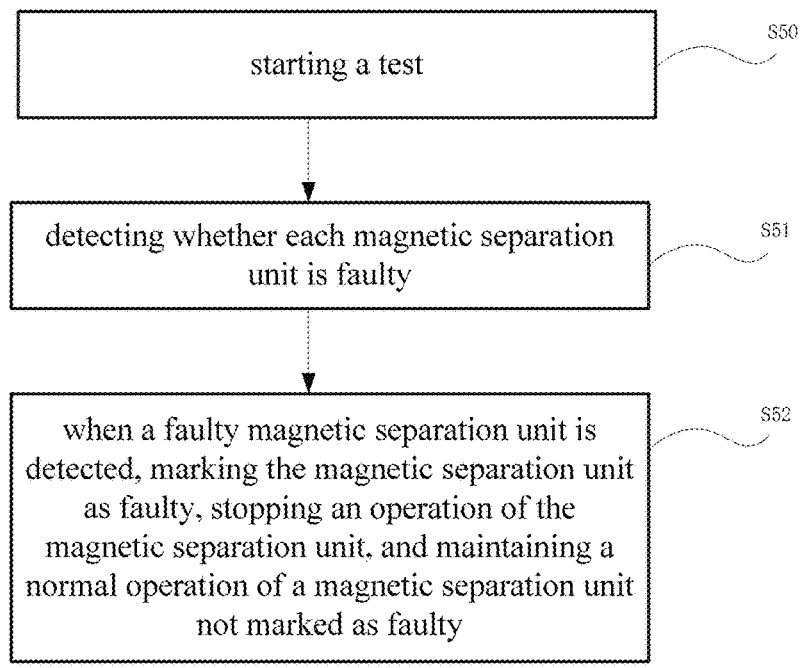
FIG. 9 is a second flow diagram of an automatic analysis operating method of one embodiment.

In one embodiment, referring to FIG. 9, the operating method further comprises steps S50 to S52.

Step S50: starting a test;

Step S51: each magnetic separation unit is monitored to determine whether it is faulty. For example, after the test starts, the detection module of each magnetic separation unit detects in real time whether each moving functional component of the magnetic separation unit operates in a normal way, and when the detection module of any magnetic separation unit detects that any moving functional component of the magnetic separation unit cannot operate in a normal way, the magnetic separation unit is marked as faulty.

Step S52: when a faulty magnetic separation unit is detected, the magnetic separation unit is marked as faulty, and the operation of the magnetic separation unit is stopped, while the magnetic separation unit not marked as faulty is maintained in a normal operation, e.g., the magnetic separation unit not marked as faulty is controlled to still receive a reaction cup in the corresponding reaction cup receiving cycle. In one embodiment, the step S52 comprises: providing two magnetic separation units;

when a faulty magnetic separation unit is detected, marking the magnetic separation unit as faulty and stopping the operation of the magnetic separation unit, and controlling the magnetic separation unit not marked as faulty to receive a reaction cup in the corresponding cycle of receiving a reaction cup; and controlling the sample dispensing mechanism, the reagent unit and the reagent dispensing mechanism to coordinate with the operation of the magnetic separation unit not marked as faulty in an intermittent operation manner of operating for one cycle and then stopping operation for one cycle, such that the reaction cup that has been incubated and is about to perform magnetic separation cleaning is located in time sequence in the cycle of receiving a reaction cup corresponding to the magnetic separation unit not marked as faulty.

The above is the operating method after a fault occurs in the case of multiple magnetic separation units in one embodiment of the present disclosure. In the related art, there are also schemes having two magnetic separation units. One of the schemes is for implementing a two-step test, in which two units need to be arranged in the test process, and the two magnetic separation units can only perform the step of first magnetic separation or the second step of magnetic separation. However, the function of each unit is limited by the whole machine scheme and cannot be flexibly called in the test sequence, which has no effect on increasing the test speed and cannot realize the single magnetic separation operation mode. The present disclosure uses a scheme in which multiple magnetic separation plates are independently arranged, which not only contributes to the test speed, but also has flexibility and interchangeability that cannot be achieved by other schemes.

The specific magnetic separation cleaning process of the magnetic separation unit will be described below.

In one embodiment, the operating method further comprises: after the magnetic separation unit receives a reaction cup, the reaction cup is subjected to Y-stage magnetic separation cleaning; where Y is an integer greater than or equal to 1; and for any stage of magnetic separation cleaning, the operating method comprises: adding a separation solution to the reaction cup to perform magnetic separation cleaning for the reaction solution in the reaction cup; then performing solution aspiration on the reaction cup so as to complete magnetic separation cleaning of this stage; and allowing the reaction cup after the Y-stage magnetic separation cleaning to wait for being transferred out of the magnetic separation unit, or adding a substrate to the reaction cup after the Y-stage magnetic separation cleaning, and waiting for being transferred out of the magnetic separation unit. For example, in the magnetic separation cleaning of a one-step test project and in the magnetic separation cleaning of the last step of a multi-step test project, a substrate needs to be added, because the next process of the reaction cup is the measurement, e.g., the optical measurement at the optical measurement station by the optical measurement unit; and however, for other magnetic separation cleaning, e.g., in a multi-step test project, in any other one-step test other than the last one-step test, it does not need to add a substrate after magnetic separation cleaning, so the reaction cup should be subjected to the subsequent steps of test.

Figure 10:
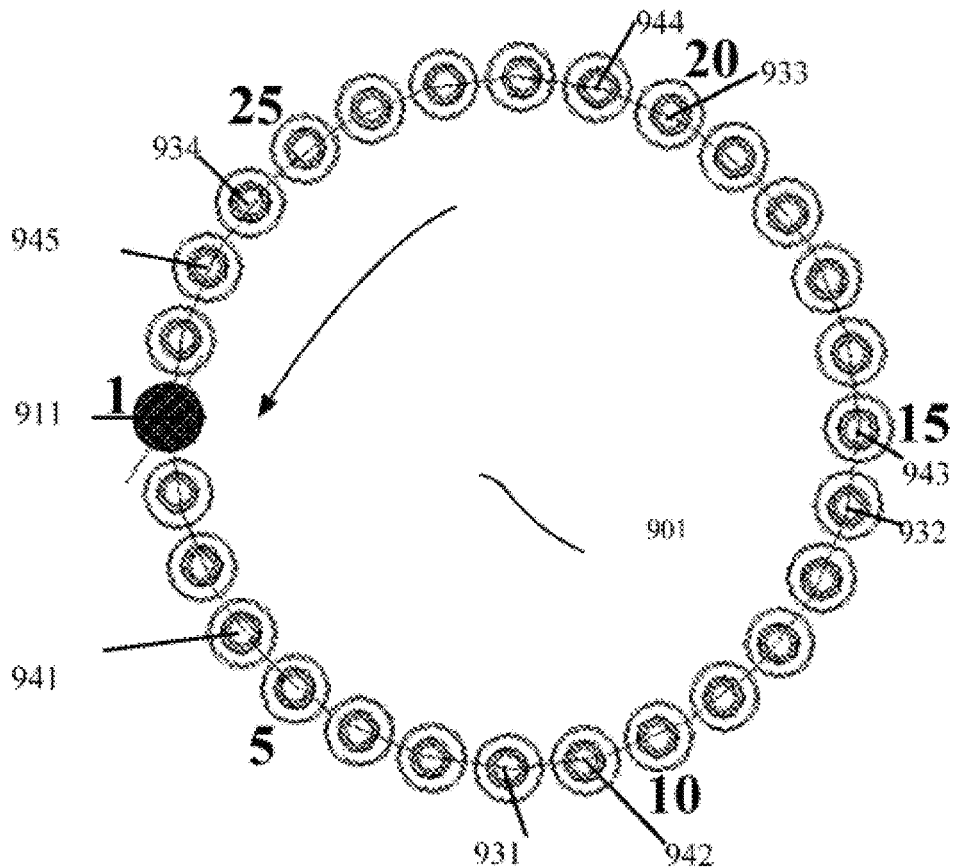
FIG. 10 is a diagram of a placement station of a four-stage magnetic separation plate of the magnetic separation unit in FIG. 2.

Taking the magnetic separation unit 91 or 92 in FIG. 11 as an example, the specific operation process of the magnetic separation unit is illustrated. Referring to FIG. 10 and table 1, FIG. 10 is an illustration of a four-stage magnetic separation plate of the magnetic separation unit in FIG. 2. The cup station in table 1 refers to the placement station on the magnetic separation plate for placement of a reaction cup.

TABLE 1

| cup station | Magnetic separation solution aspiration and injection action | Action of magnetic separation plate 901 |
|---|---|---|
| 1 | Operation station for a reaction cup to move in and out of a magnetic separation plate | Advance one cup station counterclockwise every two cycles |
| 2, 3 | Two cup stations | Advance two cup stations counterclockwise |
| 4 | Inject a separation solution into a reaction cup by the first-stage solution-injection pin 941, with magnets being distributed on the magnetic separation compartment 907 outside the cup station, and start magnetic separation on a reaction solution | Advance one cup station counterclockwise |
| 5-7 | Magnets distributed on the magnetic separation compartment 907 outside the cup station, and magnetic separation | Advance three cup stations counterclockwise |

TABLE 1-continued

| cup station | Magnetic separation solution aspiration and injection action | Action of magnetic separation plate 901 |
|---|---|---|
| 8 | Magnets are distributed on the magnetic separation compartment 907 outside the cup station, and under a magnetic field, the first-stage magnetic separation solution-aspiration pin 931 is driven by the driving motor 905 to descend to the bottom of the cup for solution aspiration and is controlled to start a first magnetic separation solution-aspiration peristaltic pump at the same time | Advance one cup station counterclockwise |
| 9 | A separation solution is injected into a reaction cup by a second-stage solution-injection pin 942, and the reaction cup is driven by a mixing belt 906 to rotate for mixing | Advance one cup station counterclockwise |
| 10-13 | Magnetic separation | Advance four cup stations counterclockwise |
| 14 | Under a magnetic field, the second magnetic separation solution-aspiration pin 932 descends to the bottom of the cup for solution aspiration | Advance one cup station counterclockwise |
| 15 | A separation solution is injected by a third-stage solution-injection pin 943, and the mixing belt 906 rotates for mixing | Advance one cup station counterclockwise |
| 16-19 | Magnetic separation | Advance four cup stations counterclockwise |
| 20 | Under a magnetic field, the third-stage solution-aspiration pin 933 performs solution aspiration | Advance one cup station counterclockwise |
| 21 | A separation solution is injected by a fourth-stage solution-injection pin 944, and the mixing belt 906 rotates for mixing | Advance one cup station counterclockwise |
| 22-25 | Magnetic separation | Advance four cup stations counterclockwise |
| 26 | Under a magnetic field, the fourth-stage solution-aspiration pin 934 performs solution aspiration | Advance one cup station counterclockwise |
| 27 | A substrate is injected by a substrate injection pin 945, and 906 rotates for mixing | Advance one cup station counterclockwise |
| 28 | One cup station | Advance one cup station counterclockwise, and return to the magnetic separation unit transferring operation station 911 |

According to the present disclosure, by means of the alternate operation of the two magnetic separation plates and the matching in test cycle with other units and mechanisms, the test speed and the reliability of whole machine are increased.

In order to improve the understanding of the present disclosure, taking the automatic analysis apparatus in FIG. 11 as an example below, the processes of a two-component one-step test project, a three-component one-step test project, a two-step one-separation test project and a two-step two-separation test project are respectively specifically illustrated.

Taking the automatic analysis apparatus in FIG. 11 as an example, the cycle is 7.5 seconds, the magnetic separation unit 91 is used to receive a reaction cup in an even-numbered cycle, and the magnetic separation unit 92 is used to receive a reaction cup in an odd-numbered cycle; the mixing mechanism 81 is used to receive a reaction cup in an even-numbered cycle, and the mixing mechanism 82 is used to receive a reaction cup in an odd-numbered cycle; and the processes of a two-component one-step test project, a three-component one-step test project, a two-step one-separation test project and a two-step two-separation test project are respectively specifically illustrated below.

Referring to the figure, the process of a two-component one-step test project is firstly illustrated, in which the reagent dispensing mechanism 6 is configured to add two reagents at most to a reaction cup at the reagent addition station 412 each time.

Cycle 1: a new reaction cup is grabbed from the transport mechanism 104 by the first cup gripper 2 and placed at the sample addition station 31, and a sample is added to the reaction cup at the sample addition station 31 by the sample pin.

Cycle 2: the reaction cup after sample addition is transferred from the sample addition station 31 to the first front operation station 411 at the outer circle portion of the reaction plate by the first cup gripper 2, and the reaction plate rotates to take the reaction cup to be added with a reagent to the reagent addition station 412; a first reagent may be aspirated by the reagent pin, a second reagent is then aspirated after the outer wall is cleaned, and the two reagents are then discharged together into the reaction cup at the reagent addition station 412; and the reaction plate then rotates to transfer the reaction cup after reagent addition to the first rear operation station 413, the reaction cup is transferred from the first rear operation station 413 to the available mixing mechanism 81 or 82 by the second cup gripper 7, and if the mixing mechanism 81 is configured to receive the reaction cup in an even-numbered cycle, the reaction cup is received by the mixing mechanism 81 at the moment, i.e., the reaction cup is transferred from the first rear operation station 413 to the available mixing mechanism 81 by the second cup gripper 7.

Cycle 3: the mixing mechanism 81 performs a mixing operation on the above reaction cup.

Cycle 4: in this cycle or at the end of the last cycle, the reaction cup after mixing is grabbed from the mixing mechanism 81 back to the second rear operation station 42 at the inner circle portion of the reaction plate by the second cup gripper 7 and is then incubated;

the reaction cup is incubated at the inner circle portion of the reaction plate for a predetermined time according to the needed incubation time; and after incubation in the reaction plate, the reaction cup is rotated to the second rear operation station 42, grabbed by the second cup gripper 7, and placed into an available magnetic separation unit 91 or 92 to perform magnetic separation cleaning; and a substrate is injected after magnetic separation cleaning, and the reaction cup is transferred to the first rear operation station 413 at the outer circle portion of the reaction plate 4. After that, the reaction cup advances 11 cup stations counterclockwise in the reaction plate 4 in each cycle, and when it advances to an optical measurement station 414 in a certain cycle, the substrate has been incubated at the moment, and the optical measurement may be performed. It should be noted that by means of the configuration of the time sequence and the number of cup stations at the outer circle portion of the reaction plate, after the reaction cup is transferred to the first rear operation station 413, when it advances to the optical measurement station 414, the substrate has been incubated at the moment; and the reaction cup after optical measurement will advance to the waste solution aspiration station 415 in a certain subsequent cycle, the reaction solution is aspirated by the waste solution aspiration unit 11, after the waste solution aspiration unit 11 is lifted, the reaction cup then further advances along with the reaction plate, will advance to the first front operation station 411 of the reaction plate in a certain subsequent cycle, and is grabbed to the cup discarding hole 201 or 202 by the first cup gripper 2 to perform cup discarding.

The process of a three-component one-step test project is then illustrated. Taking a one-step project as an example, it needs to add three reagents, including a, b and c, in which two components (a+b) are added in the first time, and one component (c) is added in the second time, the process being as follows.

Cycle 1: a new cup is grabbed from the transport mechanism 104 by the first cup gripper 2 and placed at the sample addition station 31, and a sample is added to the reaction cup at the sample addition station 31 by the sample pin.

Cycle 2: the reaction cup after sample addition is transferred from the sample addition station 31 to the first front operation station 411 at the outer circle portion of the reaction plate by the first cup gripper 2, and the reaction plate rotates to take the reaction cup to be added with a reagent to the reagent addition station 412; at the same time, one cavity a of a needed reagent bottle 51 is rotated by the reagent unit 5 for a reagent pin solution aspiration station 6a, inner and outer walls of the reagent pin are cleaned, a first component a is aspirated, the reagent pin then returns to the reagent pin cleaning tank unit 61, and in order to prevent the first component from being carried into the reagent cavity of the next component to contaminate the reagent, cleaning is performed on the outer wall; at the same time, the other cavity b of the reagent bottle 51 is rotated by the reagent unit to a corresponding reagent pin solution aspiration station 6b, a component b is aspirated by the reagent pin, the reagent pin then moves to a position above the reaction plate 4, and the reagents a+b are discharged into the reaction cup at the reagent addition station 412 of the reaction plate 4; and the reaction plate rotates counterclockwise, the reaction cup is transferred from the reagent addition station 412 at the outer circle portion to the first rear operation station 413, and the reaction plate 4 advances 11 cup stations counterclockwise in each cycle, so that the reaction cup is transferred from the first rear operation station 413 to the available mixing mechanism 81 or 82 by the second cup gripper 7.

Cycle 3: the mixing mechanism 81 or 82 will not perform mixing, but only perform temporary storage, on the above reaction cup, because the reagent has not been fully added. Of course, this is also possible if the mixing is performed.

Cycle 4: in this cycle or at the end of the last cycle, the reaction cup temporarily stored on the mixing mechanism 81 or 82 is grabbed back to the second rear operation station 42 at the inner circle portion of the reaction plate 4 by the second cup gripper 7; and in this cycle, according to the scheduling, at a specified point of time in this cycle, e.g., the above first rotation stopping action of the reaction plate, the reaction cup is transferred to the second front operation station 41 by the reaction plate, the reaction cup is transported to the temporary storage station 121 of the temporary storage portion 12 (or the temporary storage plate 12) by the first cup gripper 2 to perform temporary storage, and the temporary storage plate 12 rotates to transfer the reaction cup to the temporary storage station 122, where the rotation action of the temporary storage plate 12 is an action designed for the sample pre-dilution and pre-treatment process, and considering that one dilution or pretreatment test may be followed in the next cycle, the rotation action of the temporary storage plate 12 will be reserved here.

cycle 5: in this cycle, the sample pin stops starting a new test, the reaction cup at the temporary storage station 122 is transported to the first front operation station 411 at the outer circle portion of the reaction plate 4 by the first cup gripper, the reaction plate rotates to take the reaction cup to be added with a reagent to the reagent addition station 412, and at the same time, one cavity c of the needed reagent bottle 51 is rotated to a reagent pin solution aspiration station 6c by the reagent unit 5, the inner and outer walls of the reagent pin are cleaned, a component c is aspirated, and then the reagent pin moves to a position above the reaction plate 4 to discharge the component c into the reaction cup at the reagent addition station 412 of the reaction plate 4; and the reaction plate rotates counterclockwise, the reaction cup is transferred from the reagent addition station 412 at the outer circle portion to the first rear operation station 413, and the reaction plate 4 advances 11 cup stations counterclockwise in each cycle, so that the reaction cup is grabbed to the available mixing mechanism 81 or 82 by the second cup gripper 7.

Cycle 6: the mixing mechanism performs mixing;

Cycle 7: in this cycle or at the end of the last cycle, the reaction cup after mixing is grabbed from the mixing mechanism 81 or 82 back to the second rear operation station 42 at the inner circle portion of the reaction plate by the second cup gripper 7 and is then incubated;

the reaction cup is incubated at the inner circle portion of the reaction plate for a predetermined time according to the needed incubation time; and after incubation of the reaction cup in the reaction plate, the reaction cup is rotated to the second rear operation station 42, grabbed by the second cup gripper 7, and placed into an available magnetic separation unit 91 or 92 to perform magnetic separation cleaning; and a substrate is injected after magnetic separation cleaning, and the reaction cup is transferred to the first rear operation station 413 at the outer circle portion of the reaction plate 4. After that, the reaction cup advances 11 cup stations counterclockwise in the reaction plate 4 in each cycle, and when it advances to an optical measurement station 414 in a certain cycle, the substrate has been incubated at the moment, and the optical measurement may be performed; and the reaction cup after optical measurement will advance to the waste solution aspiration station 415 in a certain subsequent cycle, the reaction solution is aspirated by the waste solution aspiration unit 11, after the waste solution aspiration unit 11 is lifted, the reaction cup then further advances along with the reaction plate, will advance to the first front operation station 411 of the reaction plate in a certain subsequent cycle, and is grabbed to the cup discarding hole 201 or 202 by the first cup gripper 2 to perform cup discarding.

The above is the test process of a three-component one-step project. Regardless of a one-step test project, a multi-step test project, or a test process of sample pre-dilution or pre-treatment, as long as the number of types of reagent components to be added in a certain step of test is greater than the preset number of types of reagents (e.g., the above two types) of the reagent dispensing mechanism 6, the test project may be divided into several new one-step test processes to add the reagent in multiple steps.

The process of a two-step one-separation test project is then illustrated.

Cycle 1: a new cup is grabbed from the transport mechanism 104 by the first cup gripper 2 and placed at the sample addition station 31, and a sample is added to the reaction cup at the sample addition station 31 by the sample pin.

Cycle 2: the reaction cup after sample addition is transferred from the sample addition station 31 to the first front operation station 411 at the outer circle portion of the reaction plate by the first cup gripper 2, the reaction cup is then transferred to the reagent addition station 412, and the reaction cup after reagent addition is transferred from the reagent addition station 412 to the first rear operation station 413.

If the case 1 occurs, i.e., in this cycle, a reaction cup at the inner circle portion of the reaction plate 4 needs to be transferred to the second front operation station 41 of the inner circle portion, e.g., a reaction cup needs to be transferred from the inner circle portion of the reaction plate 4 to the temporary storage portion, the reaction cup needs to be firstly transferred to the second front operation station 41 of the inner circle portion so that the first cup gripper 2 performs grabbing; therefore, the reaction plate 4 will firstly perform the above first rotation stopping action to transfer the relevant reaction cup to the second front operation station 41 of the inner circle portion so that the reaction cup is grabbed to the temporary storage portion by the first cup gripper 2, and then perform the above third rotation stopping action to transfer the reaction cup after sample addition to the reagent addition station 412 at the outer circle portion of the reaction plate.

If the case 2 occurs, i.e., in this cycle, a reaction cup on the inner circle portion of the reaction plate 4 is to be transferred to the second rear operation station 42, e.g., a reaction cup after incubation needs to be performed magnetic separation cleaning and thus needs to be transferred to the magnetic separation unit, the reaction cup needs to be firstly transferred to the second rear operation station 42 so that the reaction cup is transferred to the magnetic separation unit by the second cup gripper 7; therefore, the reaction plate 4 will firstly perform the above second rotation stopping action to transfer the relevant reaction cup to the second rear operation station 42 of the inner circle portion so that the reaction cup is transferred to the magnetic separation unit by the second cup gripper 7, and then perform the above third rotation stopping action to transfer the reaction cup after sample addition to the reagent addition station 412 at the outer circle portion of the reaction plate.

If both the above cases 1 and 2 occur, the reaction plate 4 will successively perform the above first rotation stopping action, the second rotation stopping action and the third rotation stopping action.

In any case, after the third rotation stopping action, the fourth rotation stopping action will be performed in this cycle to transfer the reaction cup after reagent addition from the reagent addition station 412 to the first rear operation station 413.

Cycle 3: the mixing mechanism 81 or 82 performs mixing;

Cycle 4: in this cycle or at the end of the last cycle, the reaction cup after mixing is grabbed back to the second rear operation station 42 at the inner circle portion of the reaction plate 4 by the second cup gripper 7 and is then incubated;

the reaction cup is incubated at the inner circle portion of the reaction plate for a predetermined time according to the needed incubation time; and after incubation of the reaction cup in the reaction plate, according to the scheduling (e.g., the above first rotation stopping action of the reaction plate), the reaction cup is transferred to the second front operation station 41 by the reaction plate and is picked from the inner circle portion of the reaction plate by the first cup gripper 2 and placed into the temporary storage station 121 on the temporary storage plate 12 to perform temporary storage, and the temporary storage plate 12 rotates one cup station.

A next cycle as followed: the reaction cup is transported from the temporary storage station 122 to the first front operation station 411 at the outer circle portion of the reaction plate 4 by the first cup gripper, the reaction plate rotates to take the reaction cup to be added with a reagent to the reagent addition station 412. Similarly, if the reaction plate further has other scheduling actions (i.e., the above first rotation stopping action and second rotation stopping action of the reaction plate), the reaction cup will be transferred to a further position at the outer circle portion and then transferred from the further position to the reagent addition station 412, so that although there is a change in path, the final effect of scheduling is to transfer the reaction cup from the first front operation station 411 to the reagent addition station 412. A reagent is added to the reaction cup by the reagent dispensing mechanism 6, the reagent dispensing mechanism 6 is lifted after the solution discharge action, the reaction plate 4 rotates counterclockwise to transfer the reaction cup from the reagent addition station 412 to the first rear operation station 413 and at the same time enable the reaction plate 4 to advance 11 cup stations counterclockwise in each cycle, and the reaction cup is grabbed to the available mixing mechanism 81 or 82 by the second cup gripper 7.

A further next cycle: the mixing mechanism 81 or 82 performs mixing;

A further next cycle: in this cycle or at the end of the last cycle, the reaction cup after mixing is grabbed back to the inner circle cup station of the second rear operation station 42 of the reaction plate by the second cup gripper and is then incubated;

the reaction cup is incubated at the inner circle portion of the reaction plate for a predetermined time according to the needed incubation time; and after incubation of the reaction cup in the reaction plate, the reaction cup is transferred to the second rear operation station 42 (e.g., the second rotation stopping action of the reaction plate 4) by the reaction plate 4, and the reaction cup is grabbed out by the second cup gripper 7 and placed into the available magnetic separation unit 91 or 92 to perform magnetic separation cleaning; and a substrate is injected after magnetic separation cleaning, and the reaction cup is transferred to the first rear operation station 413 at the outer circle portion of the reaction plate 4. After that, the reaction cup advances 11 cup stations counterclockwise in the reaction plate 4 in each cycle, and when it advances to an optical measurement station 414 in a certain cycle, the substrate has been incubated at the moment, and the optical measurement may be performed; and the reaction cup after optical measurement will advance to the waste solution aspiration station 415 in a certain subsequent cycle, the reaction solution is aspirated by the waste solution aspiration unit 11, after the waste solution aspiration unit 11 is lifted, the reaction cup then further advances along with the reaction plate, will advance to the first front operation station 411 of the reaction plate in a certain subsequent cycle, and is grabbed to the cup discarding hole 201 or 202 by the first cup gripper 2 to perform cup discarding.

The process of a two-step two-separation test project is then illustrated.

Cycle 1: a new cup is grabbed from the transport mechanism 104 by the first cup gripper 2 and placed at the sample addition station 31, and a sample is added to the reaction cup at the sample addition station 31 by the sample pin.

Cycle 2: the reaction cup after sample addition is transferred from the sample addition station 31 to the first front operation station 411 at the outer circle portion of the reaction plate by the first cup gripper 2, the reaction cup is then transferred to the reagent addition station 412, and the reaction cup after reagent addition is transferred from the reagent addition station 412 to the first rear operation station 413.

If the case 1 occurs, i.e., in this cycle, a reaction cup at the inner circle portion of the reaction plate 4 needs to be transferred to the second front operation station 41 of the inner circle portion, e.g., a reaction cup needs to be transferred from the inner circle portion of the reaction plate 4 to the temporary storage portion, the reaction cup needs to be firstly transferred to the second front operation station 41 of the inner circle portion so that the first cup gripper 2 performs grabbing; therefore, the reaction plate 4 will firstly perform the above first rotation stopping action to transfer the relevant reaction cup to the second front operation station 41 of the inner circle portion so that the reaction cup is grabbed to the temporary storage portion by the first cup gripper 2, and then perform the above third rotation stopping action to transfer the reaction cup after sample addition to the reagent addition station 412 at the outer circle portion of the reaction plate.

If the case 2 occurs, i.e., in this cycle, a reaction cup on the inner circle portion of the reaction plate 4 is to be transferred to the second rear operation station 42, e.g., a reaction cup after incubation needs to be performed magnetic separation cleaning and thus needs to be transferred to the magnetic separation unit, the reaction cup needs to be firstly transferred to the second rear operation station 42 so that the reaction cup is transferred to the magnetic separation unit by the second cup gripper 7; therefore, the reaction plate 4 will firstly perform the above second rotation stopping action to transfer the relevant reaction cup to the second rear operation station 42 of the inner circle portion so that the reaction cup is transferred to the magnetic separation unit by the second cup gripper 7, and then perform the above third rotation stopping action to transfer the reaction cup after sample addition to the reagent addition station 412 at the outer circle portion of the reaction plate.

If both the above cases 1 and 2 occur, the reaction plate 4 will successively perform the above first rotation stopping action, the second rotation stopping action and the third rotation stopping action.

In any case, after the third rotation stopping action, the fourth rotation stopping action will be performed in this cycle to transfer the reaction cup after reagent addition from the reagent addition station 412 to the first rear operation station 413.

Cycle 3: the mixing mechanism 81 or 82 performs mixing;

Cycle 4: in this cycle or at the end of the last cycle, the reaction cup after mixing is grabbed back to the second rear operation station 42 at the inner circle portion of the reaction plate 4 by the second cup gripper 7 and is then incubated;

the reaction cup is incubated at the inner circle portion of the reaction plate for a predetermined time according to the needed incubation time; and after incubation of the reaction cup in the reaction plate, according to the scheduling (e.g., the above second rotation stopping action of the reaction plate 4), the reaction cup is transferred to the second rear operation station 42 by the reaction plate and is picked out by the second cup gripper 7 and placed into the available magnetic separation unit 91 or 92 to perform magnetic separation cleaning; and after magnetic separation cleaning, the reaction cup after the first magnetic separation cleaning is picked from the magnetic separation unit transferring operation station 911 or 921 by the second cup gripper 7 and placed into the first rear operation station 413 at the outer circle portion of the reaction plate, the reaction plate 4 rotates clockwise to take the reaction cup to the first front operation station 411, the reaction cup is picked from the first front operation station 411 at the outer circle portion of the reaction plate by the first cup gripper 2 and placed into the temporary storage station 121 of the temporary storage plate 12, and the temporary storage plate 12 rotates.

A next cycle as followed: the reaction cup is picked from the temporary storage station 122 by the first cup gripper 2 and placed into the first front operation station 411 at the outer circle portion of the reaction plate, the reaction plate rotates to take the reaction plate to be added with a reagent to the reagent addition station 412, and a reagent is added by the reagent pin; and the reaction plate rotates 14 cup stations counterclockwise to the first rear operation station 413, and the reaction cup is grabbed to the available mixing mechanism 81 or 82 by the second cup gripper 7.

A further next cycle: the mixing mechanism performs mixing;

A further next cycle: in this cycle or at the end of the last cycle, the reaction cup after mixing is grabbed back to the second rear operation station 42 at the inner circle portion of the reaction plate by the second cup gripper 7 and is then incubated; the reaction cup is incubated at the inner circle portion of the reaction plate for a predetermined time according to the needed incubation time; and after incubation of the reaction cup in the reaction plate, the reaction cup is transferred to the second rear operation station 42 (e.g., the second rotation stopping action of the reaction plate 4) by the reaction plate 4, and the reaction cup is grabbed out by the second cup gripper 7 and placed into the available magnetic separation unit 91 or 92 to perform magnetic separation cleaning; and a substrate is injected after magnetic separation cleaning, and the reaction cup is transferred to the first rear operation station 413 at the outer circle portion of the reaction plate 4. After that, the reaction cup advances 11 cup stations counterclockwise in the reaction plate 4 in each cycle, and when it advances to an optical measurement station 414 in a certain cycle, the substrate has been incubated at the moment, and the optical measurement may be performed; and the reaction cup after optical measurement will advance to the waste solution aspiration station 415 in a certain subsequent cycle, the reaction solution is aspirated by the waste solution aspiration unit 11, after the waste solution aspiration unit 11 is lifted, the reaction cup then further advances along with the reaction plate, will advance to the first front operation station 411 of the reaction plate in a certain subsequent cycle, and is grabbed to the cup discarding hole 201 or 202 by the first cup gripper 2 to perform cup discarding.

It should be noted that the cycle is of a fixed duration, but how to define the start and end points of each cycle can be determined according to the actual situation, e.g., if one cycle is 2 seconds, the first and second seconds can be defined as a cycle, or the second and third seconds can also be defined as a cycle, so that the operations performed in the corresponding cycle are slightly different. The examples described above illustrate the actions performed by some mechanisms and units in each cycle, which is only a way to define the cycle. Those skilled in the art would have understood that as long as the duration of the cycle is constant, how to define the start point of the cycle and all the changes in the actions performed by the mechanisms and units in each cycle fall within the concept of the present disclosure.

In addition, in a biochemical or immunological analysis apparatus, since the sample pin, the reagent pin, the magnetic separation solution-aspiration pin, the solution-injection pin or other probe pin is in contact with samples, reagents and other substances, its surface and inner wall will be deposited with some foreign substances, so it needs to be cleaned regularly (for example, before starting the test project every day) with a special cleaning solution to ensure its surface properties and solution absorption performance. For example, in many cases, a cleaning solution containing sodium hypochlorite as a main component is used, which has disinfection, sterilization, bleaching and decontamination functions. When the effective chlorine concentration of the sodium hypochlorite solution is about 0.5% to 1%, the cleaning effect is the best, but at this time, its stability is poor, and it is difficult to store and transport for a long time. Only when the sodium hypochlorite solution has a higher concentration, its stability is relatively high. Therefore, the currently produced sodium hypochlorite solutions are relatively high in concentration and need to be used after dilution.

The use of sodium hypochlorite solution on the analysis apparatus makes use of its sterilization and decontamination effects. In the currently used schemes, the customer manually dilutes the concentrated solution to the concentration required for the probe pin cleaning in the analysis apparatus according to the requirements of the analysis apparatus manufacturer. In order to ensure the accuracy and convenience of the customer's dilution, a container with a scale is generally provided. The volume of the container is designed such that, with the amount of diluent that ensures the use by the customer for one week as a design indicator, the customer is required to add the concentrated solution to the scale, then fill a barrel with deionized water or tap water, then shake the barrel to mix, and use the solution after standing for a while to ensure full dilution. When in use, the diluted cleaning solution can be dispensed into sample tubes or reagent bottles daily, and the sample tubes are loaded in a sample rack and transferred to the probe pin for aspiration, or the reagent bottles are loaded into a reagent plate and transferred to the probe pin for aspiration. Or else a vat of diluted solution is directly loaded into the machine, and the diluted solution is transferred to the probe pin for cleaning by means of a complicated designed pipeline system. It can be seen that the current scheme has the following problems: 1) inconvenient operation due to manual dilution; 2) inconvenient storage of the diluted solution so that it can be diluted up to the amount for use for one week at a time; 3) many steps for manual operation after dilution; and 4) the complicated fluid system for the scheme of automatic loading after dilution. The automatic analysis apparatus is provided with two cleaning solution placement stations, one of which is used to hold a container filled with a concentrated cleaning solution, and the other one is used to hold a container filled with a diluent that is used to dilute the concentrated cleaning solution, and then by means of the dispensing mechanism, e.g., the sample pin and/or the reagent pin, the solutions are quantitatively aspirated and discharged into the same reaction cup so as to complete the preparation of the diluted cleaning solution, which will be described in detail below.

Referring to FIG. 11, in one embodiment, the automatic analysis apparatus may comprise a dispensing mechanism, a reaction plate 4, a transfer mechanism, a control unit (not depicted in the figure) and two cleaning solution placement stations.

The dispensing mechanism is used for solution aspiration and solution discharge. The reaction plate 4 is configured to be of a circular plate structure, the reaction plate 4 is provided with a plurality of placement stations for placement of reaction cups, and the reaction plate 4 can rotate and drive rotation of the reaction cups inside the placement stations so as to transfer the reaction cups in the reaction plate and incubate a reaction solution in the reaction cup.

The transfer mechanism is used to transfer a reaction cup into the reaction plate 4 or out of the reaction plate 4.

In the above two cleaning solution placement stations, one of them is used to hold a container filled with a concentrated cleaning solution, and the other one is used to hold a container filled with a diluent that is used to dilute the concentrated cleaning solution. The two cleaning solution placement stations are arranged on a trajectory of motion of the dispensing mechanism.

The control unit is used to control the dispensing mechanism to respectively aspirate a solution in each of the containers at the two cleaning solution placement stations and discharge the solutions into the reaction cup to prepare a diluted cleaning solution. In one embodiment, the dispensing mechanism is controlled by the control unit to respectively quantitatively aspirate the solution in each of the containers at the two cleaning solution placement stations and discharge the solutions into the reaction cup to prepare a diluted cleaning solution.

In one embodiment, the dispensing mechanism comprises a sample dispensing mechanism 3 used to aspirate a sample and discharge the sample into a reaction cup at a sample addition station, and a reagent dispensing mechanism 6 used to aspirate a reagent and discharge the reagent into a reaction cup at a reagent addition station. In one embodiment, both the above cleaning solution placement stations are arranged on a trajectory of motion of the sample dispensing mechanism. In one embodiment, both the above cleaning solution placement stations are arranged on a trajectory of motion of the reagent dispensing mechanism. In one embodiment, in the above two cleaning solution placement stations, one of which is arranged on the trajectory of motion of the sample dispensing mechanism, and the other one is arranged on the trajectory of motion of the reagent dispensing mechanism. FIG. 11 shows one of the schemes, i.e., both the above two cleaning solution placement stations 3a, 3b are arranged on the trajectory of motion of the sample dispensing mechanism.

If the above two cleaning solution placement stations are both arranged on the trajectory of motion of the sample dispensing mechanism 3, the transfer mechanism and/or the reaction plate 4 coordinate to transfer the reaction cup to the sample addition station, and the control unit controls the sample dispensing mechanism 3 to aspirate the concentrated cleaning solution and discharge the concentrated cleaning solution into the reaction cup at the sample addition station, and controls the sample dispensing mechanism to aspirate the diluent and discharge the diluent into the reaction cup at the sample addition station. The sample addition station may be arranged outside the reaction plate 4 or may be arranged inside the reaction plate 4.

If both the cleaning solution placement stations are arranged on the trajectory of motion of the reagent dispensing mechanism 6, the transfer mechanism and/or the reaction plate 4 coordinate to transfer the reaction cup to the reagent addition station, and the control unit controls the reagent dispensing mechanism 6 to aspirate the concentrated cleaning solution and discharge the concentrated cleaning solution into the reaction cup at the reagent addition station, and controls the reagent dispensing mechanism 6 to aspirate the diluent and discharge the diluent into the reaction cup at the reagent addition station. The reagent addition station may be arranged outside the reaction plate 4 or may be arranged inside the reaction plate 4.

If one of the above two cleaning solution placement stations is arranged on the trajectory of motion of the sample dispensing mechanism 3, and the other cleaning solution placement station is arranged on the trajectory of motion of the reagent dispensing mechanism 6, the transfer mechanism and/or the reaction plate coordinate to respectively transfer the reaction cup to the sample addition station and the reagent addition station, when the reaction cup is located at the sample addition station, the control unit controls the sample dispensing mechanism 3 to aspirate the solution at the cleaning solution placement station passed thereby and discharge the solution into the reaction cup at the sample addition station, and when the reaction cup is located at the reagent addition station, the control unit controls the reagent dispensing mechanism 6 to aspirate the solution at the cleaning solution placement station passed thereby and discharge the solution into the reaction cup at the reagent addition station.

It should be noted that the above sequence of aspiration of a concentrated cleaning solution and the aspiration of a diluent is not fixed. The concentrated cleaning solution may be firstly aspirated, or the diluent may be firstly aspirated. If the aspiration of the concentrated cleaning solution and the aspiration of the diluent are respectively performed by one of the sample dispensing mechanism 3 and the reagent dispensing mechanism 6, the two mechanisms even operate in parallel, in which one of the mechanisms aspirates the concentrated cleaning solution, while the other one aspirates the diluent.

In one embodiment, the automatic analysis apparatus further comprises a mixing mechanism used to mix the reaction solution in the reaction cup; and the transfer mechanism and/or the reaction plate coordinate to transfer the reaction cup filled with the diluted cleaning solution to the mixing mechanism to perform mixing. The diluted cleaning solution after mixing can be used for cleaning.

In one embodiment, the automatic analysis apparatus further comprises a magnetic separation unit used to perform magnetic separation cleaning on the reaction solution in the reaction cup. The transfer mechanism and/or the reaction plate 4 coordinate to transfer the reaction cup filled with the diluted cleaning solution to the magnetic separation unit to clean a magnetic separation solution-injection pin and a magnetic separation solution-aspiration pin in the magnetic separation unit.

In the specific cleaning process, the diluted cleaning solution can be transferred to the sample addition station to perform cleaning on a sample pin in the sample dispensing mechanism, and the diluted cleaning solution is transferred to the reagent addition station to perform cleaning on a reagent pin in the reagent dispensing mechanism.

In one embodiment, the remaining amounts of the concentrated cleaning solution and the diluent at the two cleaning solution placement stations can be detected by means of detection on the solution level of the sample pin or the reagent pin. The percentage of the remaining amount is displayed on a software consumables interface, in which when the solution level is greater than or equal to the height of the bottle mouth, the remaining amount is 100%, when the solution level is less than or equal to the height corresponding to the dead volume set at the bottom of the bottle, the remaining amount is 0%, and the intermediate heights are calculated in percentage. When the remaining amount is less than the set remaining amount, such as 5%, the control unit is driven to give a reminder, asking the user to add the corresponding solution, and when the remaining amount is equal to 0%, the automatic dilution function is stopped, and the control unit gives an alarm.

The user only needs to load the concentrated cleaning solution and the diluent to the analyzer's designated position, and the apparatus will automatically prepare the diluted cleaning solution of the required concentration before cleaning the probe pin as required, and show the remaining amount in real time during use to remind the user to replace the corresponding solution according to the preset conditions. By means of the simple scheduling of the existing functional modules of the apparatus, it solves the problem of the convenience of operation of other schemes, and does not need to independently design a dilution solution path system responsible for preparing a diluted cleaning agent, which simplifies the design scheme, makes full use of the functions of the existing analysis apparatus and reduces the cost of whole machine. It has certain practical value and economic value.

Those skilled in the art would have understood that all or some of the functions of the various methods in the above embodiments may be implemented by means of hardware or by means of a computer program. When all or some of the functions in the above embodiments are implemented by means of a computer program, the program may be stored in a computer-readable storage medium, and the storage medium may include: a read-only memory, a random access memory, a magnetic disk, an optical disk, a hard disk, etc., and the program is executed by a computer to achieve the above functions. For example, the program is stored in a memory of the device, and when the program in the memory is executed by the processor, all or some of the above functions can be implemented. In addition, when all or some of the functions in the above embodiments are implemented by means of a computer program, the program may also be stored in a storage medium such as a server, another computer, a magnetic disk, an optical disk, a flash disk or a mobile hard disk, may be saved to memory of the local device by downloading or copying, or may perform version updating on the system of the local device. When the program in the memory is executed by the processor, all or some of the functions in the above embodiments can be implemented.

The present disclosure has been described with reference to specific examples, which are merely for the purpose of facilitating understanding of the present disclosure and are not intended to limit the present disclosure. It will be apparent to those skilled in the art that changes may be made to the specific embodiments described above in accordance with the teachings of the present disclosure.

What is claimed is:

1. An automatic analysis apparatus, comprising:
a reaction cup loading mechanism configured to supply and carry a reaction cup to a cup assignment station;
a sample unit configured to hold a sample;
a sample dispensing mechanism configured to aspirate the sample and discharge the sample into a reaction cup at a sample addition station;
a reagent unit configured to hold a reagent;
a reagent dispensing mechanism configured to aspirate the reagent and discharge the reagent into a reaction cup at a reagent addition station;
a reaction plate, which is configured to be a circular plate structure, which has a plurality of placement stations for placing reaction cups, and which is capable of rotating the reaction cups in the placement stations so as to transfer the reaction cups in the reaction plate and incubate respective reaction solutions in the reaction cups;
a mixing mechanism configured to mix the reaction solution to be mixed in each reaction cup;
a measurement unit configured to measure the reaction solution to be measured in each reaction cup;
at least two magnetic separation units, each of which operates independently and is configured to perform magnetic separation cleaning on the reaction solution in each reaction cup;
wherein each of the at least two magnetic separation units comprise a magnetic separation plate;
wherein each of the at least two magnetic separation units comprise a substrate injection mechanism with a substrate injection pin; the substrate injection pins are respectively connected to a substrate syringe and the substrate is injected into a respective reaction cup in a respective magnetic separation unit, the substrate syringe is further successively connected to substrate bottles through a substrate aspiration valve and a substrate bottle change-over valve, and the substrate bottle change-over valve is configured to select one of the substrate bottles to be connected;
a transfer mechanism configured to at least transfer a reaction cup among the reaction cup loading mechanism, the reaction plate, the mixing mechanism and the at least two magnetic separation units; and
a control unit configured to at least control operations and a time sequence of the sample dispensing mechanism, the reagent unit, the reagent dispensing mechanism, the reaction plate, the mixing mechanism, the measurement unit, the at least two magnetic separation units and the transfer mechanism.

2. The automatic analysis apparatus of claim 1, wherein each magnetic separation plate a circular plate structure, each magnetic separation plate has one or more circles of tracks for independent or simultaneous movement, each of the one or more tracks comprises a plurality of placement stations for placing reaction cups, each magnetic separation plate is capable of rotating the reaction cups in the placement stations and is configured to transfer a reaction cup inside the magnetic separation plate to a solution addition station and a solution aspiration station to perform magnetic separation cleaning, and each of the at least two magnetic separation units is separately arranged outside the reaction plate.

3. The automatic analysis apparatus of claim 2, wherein the at least two magnetic separation units are arranged separately; or, the at least two magnetic separation units are arranged coaxially and are independently driven.

4. The automatic analysis apparatus of claim 1, wherein each of the at least two magnetic separation units comprise a solution-injection mechanism having a plurality of solution-injection pins; and the at least two magnetic separation units use a shared injection unit to drive the respective solution-injection mechanisms, the injection unit is respectively connected to one of the solution-injection pins through one switch valve, and the injection unit is further connected to a cleaning solution through another switch valve.

5. The automatic analysis apparatus of claim 1, wherein each of the at least two magnetic separation units comprise a solution-aspiration mechanism with a plurality of solution-aspiration pins; and the at least two magnetic separation units use a shared peristaltic pump to drive the respective solution-aspiration mechanisms, and each of the solution-aspiration pins is connected to one channel of the shared peristaltic pump; or, each of the at least two magnetic separation units is provided with a peristaltic pump to drive the respective solution-aspiration mechanism, and each of the solution-aspiration pins is connected to one channel of the peristaltic pump.

6. The automatic analysis apparatus of claim 5, further comprising a waste solution aspiration unit configured to aspirate the reaction solution in each reaction cup that has been measured, wherein the waste solution aspiration unit comprises a waste solution aspiration pin that is connected to one channel of the peristaltic pump or the shared peristaltic pump.

7. The automatic analysis apparatus of claim 1, wherein the magnetic separation units use a shared substrate syringe to drive the respective substrate injection mechanisms, the substrate injection pins are respectively connected to the substrate syringe through a switch valve, the substrate syringe is further successively connected to the substrate bottles through the substrate aspiration valve and the substrate bottle change-over valve, and the substrate bottle change-over valve is configured to select a respective substrate bottle to be connected.

8. The automatic analysis apparatus of claim 1, wherein the reaction plate comprises an inner circle portion and an outer circle portion which are capable of rotating independently or together; the inner circle portion comprises one or more circles of tracks, each of the one or more tracks is provided with the plurality of placement stations for placing the reaction cups and incubating the reaction cups, and for transferring the reaction cups between placement stations of the inner circle portion; and the outer circle portion comprises one or more circles of tracks, each of the one or more circles of tracks is provided with a second plurality of placement stations for scheduling of reaction cups in the second placement stations between the second placement stations of the outer circle portion.

9. The automatic analysis apparatus of claim 8, wherein the reaction plate comprises: a measurement station and a waste solution aspiration station arranged at the outer circle portion of the reaction plate, wherein the reaction cups in the second placement stations are transferred to the measurement station and measured by the measurement unit; and for the reaction cups in the second placement stations that have been measured, a waste solution in each reaction cup is aspirated at the waste solution aspiration station.

10. The automatic analysis apparatus of claim 9, wherein the measurement unit and the at least two magnetic separation units are arranged separately; or the measurement station and the waste solution aspiration station are arranged at the outer circle portion of the reaction plate.

11. The automatic analysis apparatus of claim 9, further comprising a waste solution aspiration unit configured to aspirate the reaction solution in the reaction cups in the second placement stations that have been measured, wherein the waste solution aspiration unit comprises a waste solution aspiration pin having a trajectory of motion that passes the waste solution aspiration station.

12. The automatic analysis apparatus of claim 1, wherein the reagent addition station is arranged inside the reaction plate, and the sample addition station is arranged outside the reaction plate.

13. The automatic analysis apparatus of claim 8, further comprising a temporary storage portion, which is arranged independently from the reaction plate and is configured to receive and temporarily store a reaction cup that is transferred from the reaction plate by the transfer mechanism, wherein the temporary storage portion comprises at least two temporary storage stations and a rotatable circular plate configured to transfer each reaction cup between the temporary storage stations.

14. The automatic analysis apparatus of claim 13, wherein the reaction plate comprises:
the reagent addition station;
a first front operation station and a first rear operation station which are located at the outer circle portion; and
a second front operation station and a second rear operation station which are located at the inner circle portion,
wherein the first front operation station is configured for the transfer mechanism to transfer a reaction cup from the outer circle portion to the temporary storage portion, or is configured for the transfer mechanism to transfer a reaction cup from the temporary storage portion or the sample addition station to the outer circle portion; the first rear operation station is configured for the transfer mechanism to transfer a reaction cup from the outer circle portion to the mixing mechanism, or is configured for the transfer mechanism to transfer a reaction cup from one of the at least two magnetic separation units to the outer circle portion,
wherein the second front operation station is configured for the transfer mechanism to transfer a reaction cup from the inner circle portion to the temporary storage portion,
wherein the second rear operation station is configured for the transfer mechanism to transfer a reaction cup from the inner circle portion to one of the at least two magnetic separation units.

15. The automatic analysis apparatus of claim 14, wherein the transfer mechanism comprises a first cup gripper and a second cup gripper, wherein the first cup gripper is configured such that a trajectory of motion thereof passes the cup assignment station, the temporary storage portion, the sample addition station, the first front operation station and the second front operation station, wherein the second cup gripper is configured such that a trajectory of motion thereof passes the first rear operation station, the second rear operation station, the mixing mechanism and the at least two magnetic separation units.

16. The automatic analysis apparatus of claim 14, further comprising a transitional temporary storage portion, wherein the first front operation station is further configured for the transfer mechanism to discard a reaction cup that has been measured by the measurement unit.

17. The automatic analysis apparatus of claim 14, further comprising a transitional discarding portion, wherein
the first front operation station is further configured for the transfer mechanism to discard a reaction cup that has been measured by the measurement unit;
in a case where the control unit detects that the reaction cup that has been measured is not discarded at the first front operation station by the transfer mechanism, the control unit controls the transfer mechanism to stop transferring a reaction cup from the temporary storage portion or the sample addition station to the first front operation station; and
the reaction cup that has been measured but has not been discarded at the first front operation station is transferred to the first rear operation station by rotation of the outer circle portion of the reaction plate, the reaction cup that has been measured but has not been discarded is then transferred to the transitional discarding portion by the transfer mechanism for discarding.

18. The automatic analysis apparatus of claim 1, wherein the reaction cup loading mechanism comprises:
a feed compartment configured to store the reaction cup;
pick-and-place mechanism configured to pick, deliver and unload the reaction cup;
a reversing mechanism, which is engaged behind the pick-and-place mechanism and which has a delivery trough that is arranged obliquely downward from one side of the pick-and-place mechanism, the delivery trough being sized such that a lower portion of the reaction cup is capable of extending into the delivery trough, the delivery trough having a width less than a width of a hanging portion of the reaction cup, and the delivery trough having a first trough bottom wall at least at one end that is close to the pick-and-place mechanism, with a distance from the first trough bottom wall to an upper edge of the delivery trough being less than a distance from a lowermost portion of the delivery trough to the hanging portion of the reaction cup; and
the transport mechanism configured to engaged a reaction cup exit of the delivery trough and which has at least one reaction cup station for placing the reaction cup, the transport mechanism having the cup assignment station.

19. The automatic analysis apparatus of claim 1, further comprising: two cleaning solution placement stations,
wherein one of the two cleaning solution placement stations is configured to hold a container filled with a concentrated cleaning solution, and the other of the two cleaning solution placement stations is configured to hold a container filled with a diluent for diluting the concentrated cleaning solution, both of the cleaning solution placement stations are arranged on a trajectory of motion of the sample dispensing mechanism or arranged on a trajectory of motion of the reagent dispensing mechanism, or
wherein one of the two cleaning solution placement stations is arranged on the trajectory of motion of the sample dispensing mechanism, and the other one of the two cleaning solution placement stations is arranged on the trajectory of motion of the reagent dispensing mechanism.

20. An operating method for the automatic analysis apparatus according to claim 1,
wherein the operating method comprises: after a test starts, controlling the at least two magnetic separation units to receive a respective reaction cup in respective corresponding cycles, wherein when N magnetic separation units are provided, a reaction cup receiving cycle corresponding to an ith magnetic separation unit is a (kN+i)th cycle, N being an integer greater than or equal to 2, k being an integer greater than or equal to 0, and i being in a range of 1 to N.

21. The operating method of claim 20, wherein two magnetic separation units are provided, the operating method further comprising: controlling the two magnetic separation units to receive the respective reaction cup in respective corresponding cycles, wherein the reaction cup receiving cycle corresponding to one of the two magnetic separation units is an odd-numbered cycle, and the reaction cup receiving cycle corresponding to the other of the two magnetic separation units is an even-numbered cycle.

22. The operating method of claim 21, further comprising:
providing the two magnetic separation units;
before or after starting the test, detecting whether each magnetic separation units functions normally; and
when only one of the magnetic separation units functions normally, controlling said magnetic separation unit that functions normally to receive the respective reaction cup in the corresponding reaction cup receiving cycle; and
controlling the sample dispensing mechanism, the reagent unit and the reagent dispensing mechanism to coordinate with the operation of said magnetic separation unit that functions normally in an intermittent operation manner of operating for one cycle and then stopping for one cycle, such that a reaction cup that has been incubated in the reaction plate and is about to perform magnetic separation cleaning is in a time sequence within the reaction cup receiving cycle corresponding to said magnetic separation unit that functions normally.

23. The operating method of claim 20, further comprising: after a respective magnetic separation unit receives the respective reaction cup, performing Y-stage magnetic separation cleaning on the respective reaction cup, Y being an integer greater than or equal to 1; and any stage of magnetic separation cleaning comprises: adding a separation solution to the respective reaction cup, performing magnetic separation cleaning on the reaction solution in the respective reaction cup; and performing solution aspiration on the respective reaction cup so as to complete magnetic separation cleaning of the current stage; and
allowing the respective reaction cup after the Y-stage magnetic separation cleaning to wait for being transferred out of the respective magnetic separation unit; or adding a substrate to the respective reaction cup after the Y-stage magnetic separation cleaning, and waiting for being transferred out of the respective magnetic separation unit.

* * * * *